(12) United States Patent
Kim et al.

(10) Patent No.: US 12,374,057 B2
(45) Date of Patent: Jul. 29, 2025

(54) ELECTRONIC DEVICE FOR PROVIDING AUGMENTED REALITY SERVICE, AND OPERATING METHOD THEREFOR

(71) Applicant: SAMSUNG ELECTRONICS CO., LTD., Suwon-si (KR)

(72) Inventors: Jieun Kim, Suwon-si (KR); Jongwoo Jung, Suwon-si (KR); Inyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 17/982,997

(22) Filed: Nov. 8, 2022

(65) Prior Publication Data

US 2023/0061776 A1    Mar. 2, 2023

Related U.S. Application Data

(63) Continuation of application No. PCT/KR2021/005475, filed on Apr. 29, 2021.

(30) Foreign Application Priority Data

May 8, 2020    (KR) .................. 10-2020-0055217

(51) Int. Cl.
*G06T 19/00*    (2011.01)
*G06F 21/32*    (2013.01)
(Continued)

(52) U.S. Cl.
CPC ............ *G06T 19/006* (2013.01); *G06F 21/32* (2013.01); *G06T 19/20* (2013.01); *G06V 10/56* (2022.01);
(Continued)

(58) Field of Classification Search
CPC .................. G06T 19/006; G06T 19/20; G06T 2219/2004; G06F 21/32; G06V 10/56
See application file for complete search history.

(56) References Cited

U.S. PATENT DOCUMENTS 9,361,732 B2    6/2016    Ebstyne et al.
9,367,136 B2    6/2016    Latta et al.
(Continued)

FOREIGN PATENT DOCUMENTS

CN    107506037    12/2017
JP    2019-105678    6/2019
(Continued)

OTHER PUBLICATIONS

International Search Report for PCT/KR2021/005475 dated Aug. 17, 2021, 5 pages with English Translation.
(Continued)

*Primary Examiner* — Michelle Chin
(74) *Attorney, Agent, or Firm* — Nixon & Vanderhye P.C.

(57) ABSTRACT

An electronic device may include one or more of: a sensor module; a first communication circuit for supporting a first communication scheme; a low-power processor; and a processor operatively connected to the sensor module, the first communication circuit, and the lower-power processor, wherein the first communication circuit can transmit, to the low-power processor, a request signal related to the state of the electronic device based on information related to a distance measurement provided from the processor, receive information related to the state of the electronic device from the low-power processor in response to the request signal, and measure the distance to an external electronic device based on the information related to the state of the electronic device. Other embodiments are possible.

20 Claims, 27 Drawing Sheets

(51) Int. Cl.
*G06T 19/20* (2011.01)
*G06V 10/56* (2022.01)

(52) U.S. Cl.
CPC .. *G06T 2219/2004* (2013.01); *G06V 2201/07* (2022.01)

(56) References Cited

U.S. PATENT DOCUMENTS

| | | | |
|---|---|---|---|
| 10,147,243 | B2 | 12/2018 | Yamamoto et al. |
| 11,036,284 | B2 | 6/2021 | Himane |
| 11,231,827 | B2 | 1/2022 | Brems et al. |
| 2014/0192085 | A1 | 7/2014 | Kim |
| 2017/0322622 | A1 | 11/2017 | Hong et al. |
| 2018/0046264 | A1* | 2/2018 | Hong .................. G06F 1/1694 |
| 2018/0081448 | A1 | 3/2018 | Woo et al. |
| 2019/0179406 | A1 | 6/2019 | Manda et al. |
| 2019/0362560 | A1 | 11/2019 | Choi et al. |
| 2020/0005026 | A1 | 1/2020 | Andersen et al. |
| 2020/0286449 | A1* | 9/2020 | Yang .................. G02B 27/01 |
| 2021/0097776 | A1 | 4/2021 | Faulkner et al. |
| 2021/0241537 | A1 | 8/2021 | Ahn |

FOREIGN PATENT DOCUMENTS

| | | |
|---|---|---|
| KR | 10-2014-0089184 | 7/2014 |
| KR | 10-2019-0125567 | 11/2019 |
| KR | 10-2020-0027153 | 3/2020 |
| KR | 10-2099834 | 4/2020 |

OTHER PUBLICATIONS

Written Opinion for the ISA for PCT/KR2021/005475 dated Aug. 17, 2021, 8 pages with English Translation.
Korean Office Action dated Dec. 14, 2023 for KR Application No. 10-2020-0055217.

* cited by examiner

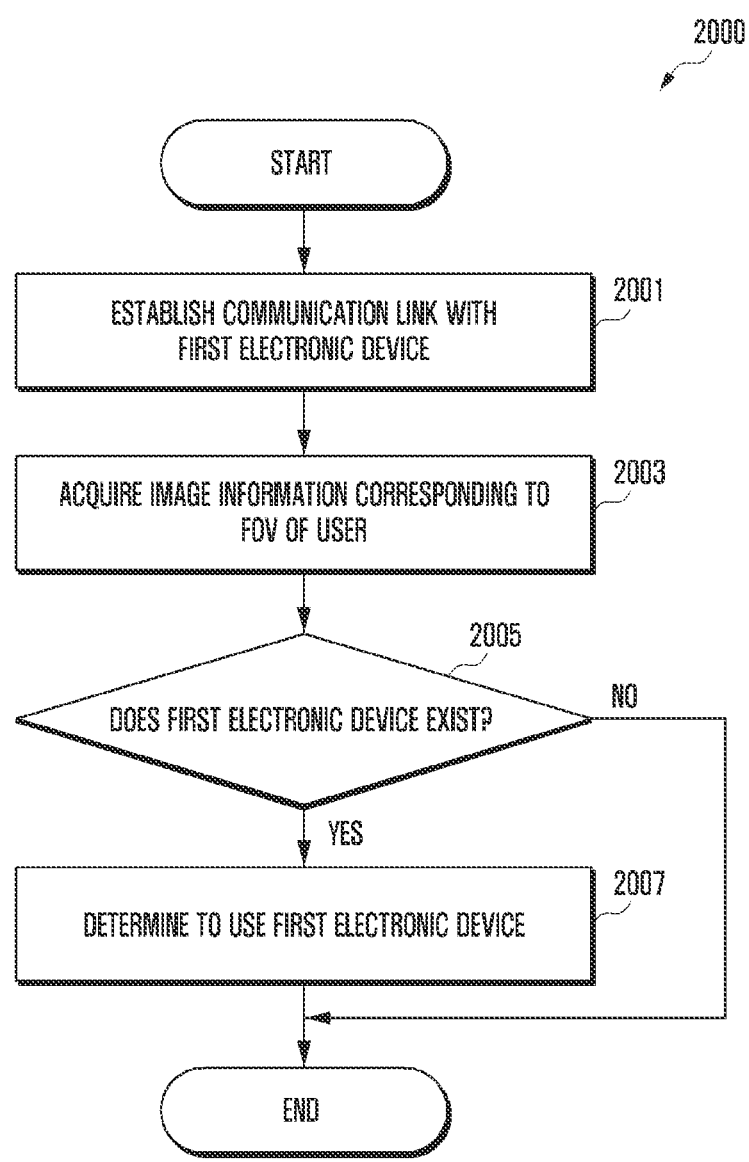

ELECTRONIC DEVICE FOR PROVIDING AUGMENTED REALITY SERVICE, AND OPERATING METHOD THEREFOR

CROSS-REFERENCE TO RELATED APPLICATIONS

This application is a continuation of International Application No. PCT/2021/005475, designating the United States, filed on Apr. 29, 2021, in the Korean Intellectual Property Receiving Office and claiming priority to Korean Patent Application No. 10-2020-0055217, filed on May 8, 2020, in the Korean Intellectual Property Office, the disclosures of which are all hereby incorporated by reference herein in their entireties.

BACKGROUND

Field

Certain example embodiments relate to an apparatus and/or a method for providing an augmented reality service in an electronic device.

Description of Related Art

With the development of information and communication technologies and semiconductor technologies, various types of electronic devices have developed into multimedia devices that provide various multimedia services. The multimedia services may include at least one of a voice call service, a message service, a broadcasting service, a wireless Internet service, a camera service, an electronic payment service, or a music reproduction service.

The electronic devices may provide various types of experience to users. For example, the electronic devices may provide the users with various types of experience based on an augmented reality (AR) service adding virtual information (for example, virtual objects) to a real space.

The augmented reality service may be provided by a mobile device, a projector, or a wearable device. For example, the wearable device may be configured in the form of glasses and worn on a user's face so that the user can experience a realistic augmented reality service. The wearable device worn the user's face may output virtual information (for example, a virtual object) to be shown as being added to a real space corresponding to a field of view of the user.

Portable communication devices (for example, mobile devices) such as smartphones have become popular and used by relatively many users. Accordingly, the electronic device (for example, the wearable device) providing the augmented reality service needs a method of interworking with the portable communication device to provide more various augmented reality services to users.

SUMMARY

Various example embodiments disclose an apparatus and/or a method by which an electronic device interworks with another electronic device to provide an augmented reality service.

According to various example embodiments, a first electronic device includes a communication circuit and a processor operatively connected to the communication circuit, and the processor may be configured to establish a communication connection with a second electronic device via the communication circuit, transmit information related to a first virtual object displayed based on a location of the first electronic device to the second electronic device via the established communication connection when it is determined that a user wearing the second electronic device uses the first electronic device, and change a reference for displaying the first virtual object, based on an input related to the first virtual object.

According to various example embodiments, a method of operating a first electronic device may include establishing a communication connection with a second electronic device, when it is determined that a user wearing the second electronic device uses the first electronic device, transmitting information related to a first virtual object displayed based on a location of the first electronic device to the second electronic device, and changing a reference for displaying the first virtual object, based on an input related to the first virtual object.

According to various example embodiments, a second electronic device may include a communication circuit, a camera, a display, and a processor operatively connected to the communication circuit, the camera, and the display, and the processor is configured to establish a communication connection with a first electronic device through the communication circuit, when it is determined to interwork with the first electronic device, acquire a first virtual object related to the first electronic device, output the first virtual object, based on a location of the first electronic device within an area corresponding to an FOV of a user wearing the second electronic device, and change a reference for displaying the first virtual object, based on an input related to the first virtual object.

According to various example embodiments, when a first electronic device (for example, a mobile device) provides an augmented reality service through a second electronic device (for example, a wearable device), it is possible to display a virtual object based on the first electronic device within the second electronic device according to the use of the first electronic device and change a reference for displaying the virtual object based on an input related to the virtual object, so as to variously provide output schemes (or expression schemes) of the virtual object related to the augmented reality service.

According to various example embodiments, the second electronic device (for example, the wearable device) can display the virtual object based on the first electronic device through an interworking with the first electronic device (for example, the mobile device) and change the reference for displaying the virtual object based on the input related to the virtual object, so as to variously provide output schemes (or expression schemes) of the virtual object related to the augmented reality service.

BRIEF DESCRIPTION OF DRAWINGS

This method and the device illustrated in the accompanying drawings, throughout which reference letters indicate corresponding parts in the various figures. Certain example embodiments herein will be better understood from the following description with reference to the drawings, in which:

FIG. 20 is a flowchart illustrating a process in which the second electronic device determines whether to interwork with the first electronic device based on image information according to various example embodiments.

DETAILED DESCRIPTION

Hereinafter, various example embodiments are described in detail with reference to the accompanying drawings.

Figure 1:
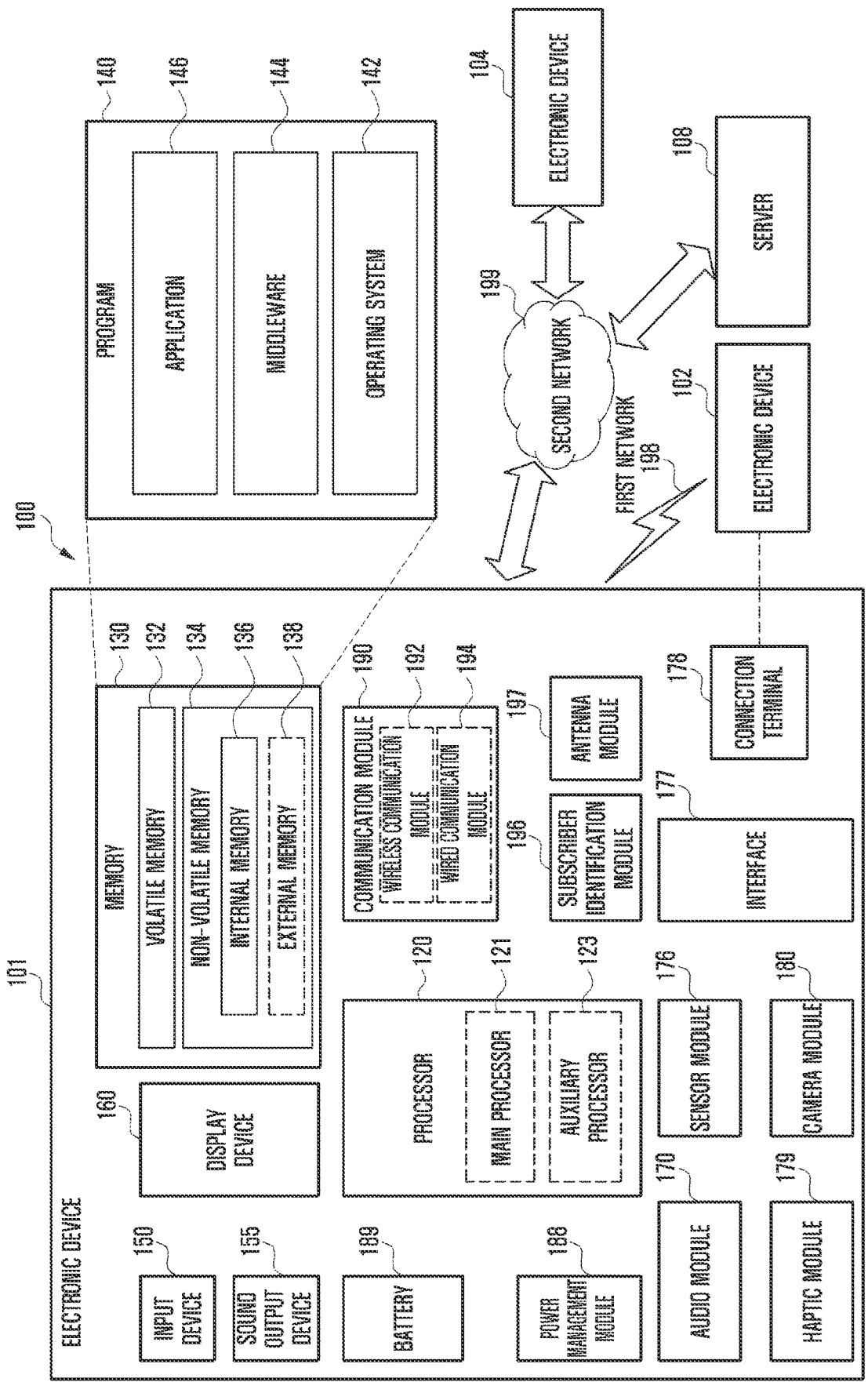
FIG. 1 is a block diagram of an electronic device within a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via at least a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
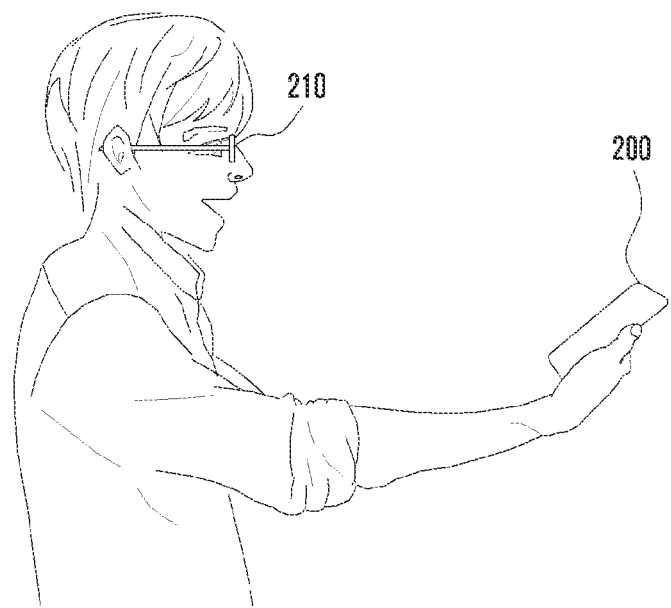
FIG. 2 illustrates configurations of electronic devices interworking with each other for an augmented reality service according to various example embodiments.

FIG. 2 illustrates configurations of electronic devices interworking with each other for an augmented reality service according to various embodiments.

Referring to FIG. 2, according to various embodiments, a first electronic device 200 and a second electronic device 210 may be connected through at least one of a wireless method and a wired method to provide an augmented reality service. According to an embodiment, the first electronic device 200 and the second electronic device 210 may be wiredly connected based on a universal serial bus (USB) method. According to an embodiment, the first electronic device 200 and the second electronic device 210 may be connected through at least one wireless communication among short-range communication or cellular communication. For example, the short-range communication may include at least one of Bluetooth, Bluetooth Low Energy (BLE), and WLAN (for example, WiFi direct). For example, the cellular communication may include at least one of long-term evolution (LTE), LTE advanced (LTE-A), 5G (or new radio (NR)), code division multiple access (CDMA), wideband CDMA (WCDMA), and global system for mobile communication (GSM).

According to various embodiments, the first electronic device 200 may transmit information related to at least one virtual object to the second electronic device 210 connected through at least one of the wireless method or the wired method. According to an embodiment, the first electronic device 200 may receive image information related to a real space corresponding to a field of view (FOV) of the user wearing the second electronic device 210 from the second electronic device 210. The first electronic device 200 may detect a virtual object to be output through the second electronic device 210 for the augmented reality service based on the image information received from the second electronic device 210. The first electronic device 200 may transmit information related to the virtual object to the second electronic device 210. For example, the information related to the virtual object may include at least one of the form (or shape), color, size, or location of the virtual object.

According to various embodiments, the second electronic device 210 may be worn on a head part of the user to provide the user with an image. According to an embodiment, when the second electronic device 210 to the first electronic device 200 through at least one of the wireless method or the wired method, the second electronic device 210 may transmit image information related to the real space corresponding to the FOV of the user acquired through a camera (for example, the camera module 180 of FIG. 1) of the second electronic device 210 to the first electronic device 200. The second electronic device 210 may output at least one virtual object to overlap at least a part of the real space corresponding to the FOV of the user wearing the second electronic device 210 based on the information related to the virtual object received from the first electronic device 200. For example, the second electronic device 210 may add information indicating a virtual object to light incident to eyes of the wearer of the second electronic device 210 so that the user wearing the second electronic device 210 can recognize that the virtual object is added to the real space. For example, the second electronic device 210 may be configured in the form of at least one of glasses, goggles, a helmet, or a hat but is not limited thereto.

According to various embodiments, the second electronic device 210 may provide the augmented reality service independently from the first electronic device 200. According to an embodiment, the second electronic device 210 may detect at least one virtual object based on image information related to the real space acquired through the camera (for example, the camera module 180 of FIG. 1) of the second electronic device 210. The second electronic device 210 may output at least one object such that the user wearing the second electronic device 210 recognizes that the at least one virtual object overlaps at least a part of the real space corresponding to the FOV.

Figure 3:
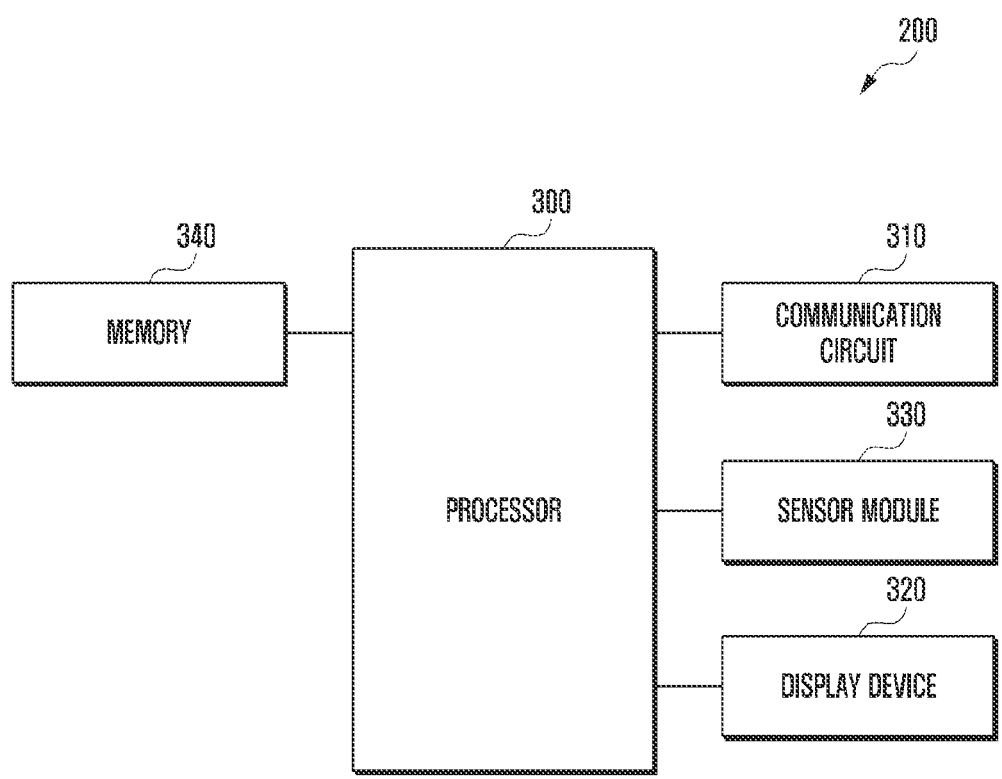
FIG. 3 is a block diagram of a first electronic device for controlling the augmented reality service according to various example embodiments.

FIG. 3 is a block diagram of the first electronic device for controlling the augmented reality service according to various embodiments. For example, the first electronic device 200 may be at least partially similar to the electronic device 101 of FIG. 1 or the first electronic device 200 of FIG. 2 or may include another embodiment of the electronic device.

Referring to FIG. 3, according to various embodiments, the first electronic device 200 may include at least one of a processor 300, a communication circuit 310, a display device 320, a sensor module 330, or a memory 340. According to an embodiment, the processor 300 may be substantially the same as the processor 120 of FIG. 1 or may be included in the processor 120. The communication circuit 310 may be substantially the same as the communication module 190 of FIG. 1 or may be included in the communication module 190. The display device 320 may be substantially the same as the display device 160 of FIG. 1 or may be included in the display device 160. The sensor module 330 may be substantially the same as the sensor module 176 of FIG. 1 or may be included in the sensor module 176. The memory 340 may be substantially the same as the memory 130 of FIG. 1 or may be included in the memory 130. According to an embodiment, the processor 300 may control at least one of the operatively connected communication circuit 310, display device 320, sensor module 330, or memory 340. Each "sensor module" herein comprises at least one sensor.

According to various embodiments, the processor 300, comprising processing circuitry, may control the communication circuit 310 to establish(or make) at least one of wireless or wired communication connections with the second electronic device 210 of FIG. 2 in order to provide the augmented reality service. According to an embodiment, when the communication connection with the second electronic device 210 related to the augmented reality service is made through the communication circuit 310, the processor 300 may perform user authentication. For example, the user authentication may be performed based on at least one of a password method, a pattern input method, or a biometric recognition method (for example, iris recognition, fingerprint recognition, or vein recognition). For example, when the user authentication is completed (for example, authentication success), the processor 300 may execute an application program related to the augmented reality service to switch to an augmented reality mode. When having switched to the augmented reality mode, the processor 300 may control the communication circuit 310 to transmit information related to the augmented reality service to the second electronic device 210. For example, the processor 300 may control the display device 320 to be deactivated based on switching to the augmented reality mode.

According to various embodiments, the processor 300 may provide the augmented reality service through the second electronic device 210 of FIG. 2 having the connection of at least one of the wireless or wired communication through the communication circuit 310. According to an embodiment, the processor 300 may receive image information related to the real space from the second electronic device 210 through the communication circuit 310. The processor 300 may acquire (or generate) at least one virtual object to be output through the second electronic device 210 based on image information received from the second electronic device 210. According to an embodiment, the processor 300 may acquire (or generate) at least one virtual object related to the application program executed in the first electronic device 200. According to an embodiment, the processor 300 may control the communication circuit 310 to transmit the information related to at least one virtual object to the second electronic device 210. For example, the information related to the virtual object may include at least one of the form (or shape), color, size, or location of the virtual object. For example, the image information received from the second electronic device 210 may include image information related to the real space corresponding to the field of view (FOV) of the user wearing the second electronic device 210. For example, at least one virtual object may include at least one piece of information related to an external object located in the real space corresponding to the FOV of the user wearing the second electronic device 210 or information related to the application program executed in the first electronic device 200. For example, the external object may be detected based on image information received from the second electronic device 210.

According to various embodiments, the processor 300 may determine whether to additionally use the first electronic device 200 while the augmented reality service using the second electronic device 210 is provided. According to an embodiment, the processor 300 may determine whether to additionally use the first electronic device 200 based on whether another application program is executed while the application program related to the augmented reality service is executed. For example, when another application program is executed while the application program related to the augmented reality service is executed, the processor 300 may determine that the first electronic device 200 is used. For example, when another application program is not executed while the application program related to the augmented reality service is executed, the processor 300 may determine that the first electronic device 200 is not used. For example, another application program may be executed based on an input related to the object corresponding to another application program displayed in the display device 320. For example, the additional use of the first electronic device 200 may include a series of operations of controlling the first electronic device 200 in order to execute a separate function (for example, Internet search) different from the augmented reality service by the user wearing the second electronic device 210. For example, the separate function may include at least one function different from the augmented reality service, such as an Internet search function, a music content reproduction function, a video content reproduction function, or a payment function.

According to an embodiment, the processor 300 may determine whether to additionally use the first electronic device 200 based on whether the display device 320 is activated. For example, when the deactivated display device 320 is activated based on switching to the augmented reality mode, the processor 300 may determine that the first electronic device 200 is used. For example, when the inactive state of the display device 320 is maintained, the processor 300 may determine that the first electronic device 200 is not used.

According to an embodiment, the processor 300 may determine whether to additionally use the first electronic device 200 based on information related to an external object included in an area corresponding to the FOV of the user wearing the second electronic device 210. For example, the processor 300 may identify whether an external object related to the first electronic device 200 exists in the area corresponding to the FOV of the user wearing the second electronic device 210 based on image information received from the second electronic device 210. For example, when the external object related to the first electronic device 200 exists in the area corresponding to the FOV of the user wearing the second electronic device 210, the processor 300 may determine that the first electronic device 200 is used. For example, when the external object related to the first electronic device 200 does not exist in the area corresponding to the FOV of the user wearing the second electronic device 210, the processor 300 may determine that the first electronic device 200 is not used. For example, the external object related to the first electronic device 200 may include at least one of external objects corresponding to all or some of the exterior configurations of the first electronic device 200 or external objects related to content displayed in the display device 320.

According to an embodiment, the processor 300 may determine whether to additionally use the first electronic device 200 based on location information of the first electronic device 200 and the second electronic device 210. For example, when the first electronic device 200 is located within a reference range of the second electronic device 210, the processor 300 may determine that the first electronic device 200 is used. For example, when the first electronic device 200 escapes the reference range of the second electronic device 210, the processor 300 may determine that the first electronic device 200 is not used. For example, the location information of the first electronic device 200 may be acquired based on the sensor module 330. The location information of the second electronic device 210 may be received from the second electronic device 210 through the communication circuit 310.

According to various embodiments, when it is determined to additionally use the first electronic device 200 while the augmented reality service using the second electronic device 210 is provided, the processor 300 may control the second electronic device 210 to display a virtual object related to the first electronic device 200 based on the first electronic device 200 (for example, the location of the first electronic device 200). According to an embodiment, when it is determined to additionally use the first electronic device 200 while the augmented reality service using the second electronic device 210 is provided, the processor 300 may control the communication circuit 310 to transmit information related to hiding of the virtual object by the second electronic device 210. For example, the information related to hiding of the virtual object may include control information indicating at least the limit on output of the virtual object related to the augmented reality service. For example, the second electronic device 210 may limit the output of the virtual object based on the information related to hiding of the virtual object received from the first electronic device 200. According to an embodiment, the processor 300 may generate the virtual object related to the first electronic device 200. The location of the virtual object related to the first electronic device 200 may be configured based on the first electronic device 200 (for example, the location of the first electronic device 200). The processor 300 may control the communication circuit 310 to transmit information related to the configured virtual object to the second electronic device 210 such that the virtual object related to the first electronic device 200 is shown as being added to at least a part corresponding to the FOV of the user. For example, the location of the virtual object configured based on the first electronic device 200 is a relative location configured based on the location of the first electronic device 200 and may be changed based on a change in the location of the first electronic device 200. For example, the location of the virtual object configured based on the first electronic device 200 may include coordinates of a coordinate system based on the location of the first electronic device 200. For example, the location of the virtual object configured based on the first electronic device 200 may include at least one of a direction or a separation distance of the virtual object configured based on the location of the first electronic device 200. For example, the virtual object related to the first electronic device 200 may include a virtual object related to an application program different from the application program related to the augmented reality service executed in the first electronic device 200 and a virtual object related to content displayed in the display device 320.

According to various embodiments, the processor 300 may change a reference for displaying the virtual object related to the first electronic device 200 which is being output through the second electronic device 210. According to an embodiment, the processor 300 may identify an input corresponding to the virtual object related to the first electronic device 200 based on image information received from the second electronic device 210 through the communication circuit 310. For example, the processor 300 may acquire motion information of an external object (for example, a user's hand) based on the image information received from the second electronic device 210. When the motion information of the external object is included in a gesture list related to the augmented reality service stored in the memory 340, the processor 300 may determine that a gesture related to the augmented reality service is detected. The processor 300 may identify a gesture related to the virtual object based on the location at which the gesture related to the augmented reality service is detected and the location at which the virtual object is displayed. For example, the gesture related to the augmented reality service may include at least one gesture mapped to at least one of the functions related to the augmented reality service or the virtual object.

According to an embodiment, when the input (for example, gesture) detected based on the image information received from the second electronic device 210 is associated with the virtual object related to the first electronic device 200, the processor 300 may control the communication circuit 310 to transmit guide information related to the display reference of the virtual object related to the first electronic device 200 to the second electronic device 210. For example, the guide information may include location information which can be configured as the reference for displaying the virtual object related to the first electronic device 200.

According to an embodiment, the processor 300 may control the communication circuit 310 to transmit change information of the virtual object related to the first electronic device 200 to the second electronic device 210 based on the input (for example, gesture) detected based on the image information received from the second electronic device 210. For example, the change information of the virtual object may include at least one of selection of the virtual object, movement of the location of the virtual object, an increase in the size of the virtual object, a decrease in the size of the virtual object, or a change in a display angle of the virtual object.

According to an embodiment, when the location (for example, the display location) of the virtual object related to the first electronic device 200 is changed based on the input (for example, gesture) detected based on the image information received from the second electronic device 210, the processor 300 may configure (or change) the reference for displaying the virtual object related to the first electronic device 200 based on the changed location of the virtual object related to the first electronic device 200. For example, when the changed location of the virtual object related to the first electronic device 200 belongs to a first interval from a reference point (for example, user location), the processor 300 may configure the reference for displaying the virtual object in a first scheme (for example, user reference). For example, the location of the virtual object configured in the first scheme is a relative location configured based on the location of the user wearing the second electronic device 210 and may be changed based on the change in the location of the user. For example, the first interval may include a range from the reference point (for example, user location) to a first point. For example, when the changed location of the virtual object related to the first electronic device 200 belongs to a second interval from the reference point (for example, user location), the processor 300 may configure the reference for displaying the virtual object in a second scheme (for example, external object reference). For example, the location of the virtual object configured in the second scheme is a relative location configured based on the location of an external object existing in the real space corresponding to the FOV of the user wearing the second electronic device 210 and may be changed based on the change in the location of the virtual object. For example, the second interval may include a range from the first point to a second point. For example, the second point may be configured to be father from the reference point (for example, user location) than the first point. For example, when the changed location of the virtual object related to the first electronic device 200 belongs to a third interval from the reference point (for example, user location), the processor 300 may configure the reference for displaying the virtual object in a third scheme (for example, background reference). For example, the location of the virtual object configured in the third scheme may be configured based on a coordinate value (for example, longitude, latitude, and/or height) of the real space corresponding to the FOV of the user wearing the second electronic device 210. For example, the third interval may include a range from the second point to a third point. For example, the third point may be configured to be relatively farther from the reference point (for example, user location) than the first point and the second point. For example, the third interval may include the second interval. For example, the reference for displaying the virtual object may include at least one of a user, an external object, a background, or another electronic device.

According to various embodiments, the communication circuit 310 may support the performance of at least one of wired or wireless communication between the first electronic device 200 and the second electronic device 210. For example, wired communication may include a USB scheme. For example, wireless communication may include a short-range communication scheme or cellular communication.

According to various embodiments, the display device 320 may display information processed by the first electronic device 200. According to an embodiment, the display device 320 may display content related to an application program executed in the first electronic device 200. According to an embodiment, the display device 320 may switch to an inactive state based on switching to the augmented reality mode.

According to various embodiments, the sensor module 330, comprising at least one sensor, may detect an operation state and an external environment state of the first electronic device 200 and provide the detected information to the processor 300. According to an embodiment, the sensor module 330 may include a motion sensor for detecting motion of the first electronic device 200 (or user). According to an embodiment, the sensor module 330 may include a location sensor (for example, global navigation satellite system (GNSS)) for detecting location information of the first electronic device 200.

According to various embodiments, the memory 340 may store various pieces of data used by at least one of at least one element (for example, the processor 300, the communication circuit 310, the display device 320, or the sensor module 330) of the first electronic device 200. For example, data may include a gesture list related to the augmented reality service.

Figure 4:
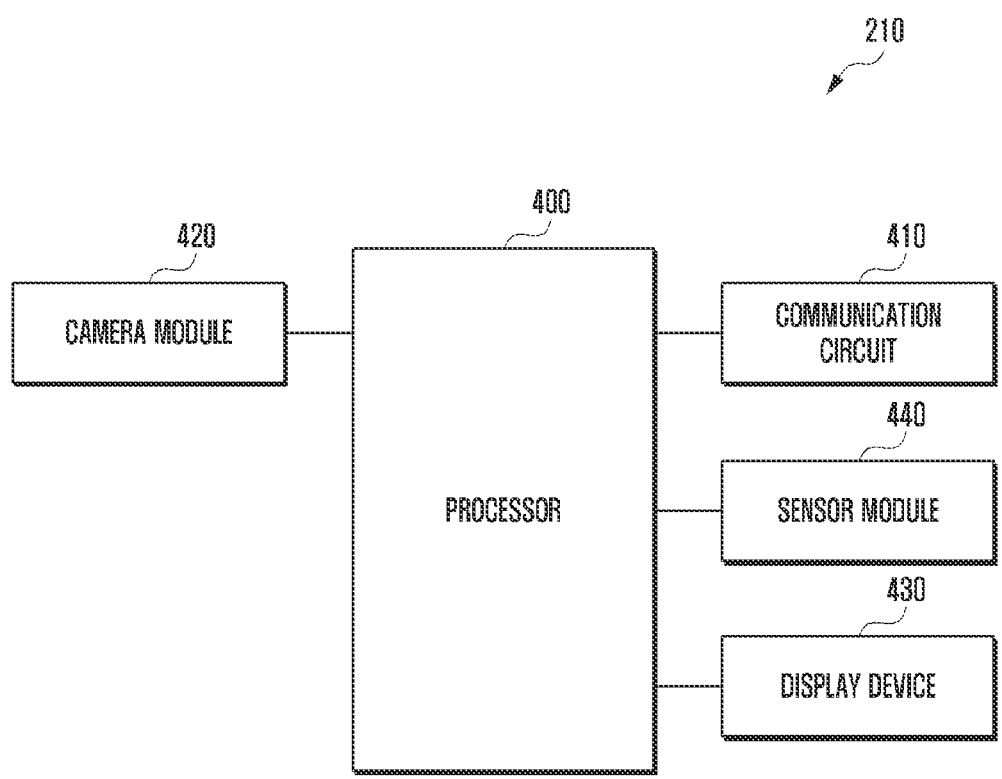
FIG. 4 is a block diagram of a second electronic device for providing the augmented reality service according to various example embodiments.

FIG. 4 is a block diagram of the second electronic device for providing the augmented reality service according to various embodiments. For example, the second electronic device 210 may be at least partially similar to the electronic device 101 of FIG. 1 or the first electronic device 200 of FIGS. 2-3, or may include another embodiment of the electronic device.

Referring to FIG. 4, according to various embodiments, the second electronic device 210 may include at least one of a processor 400, a communication circuit 410, a camera module 420, a display device 430, or a sensor module 440 comprising at least one sensor. According to an embodiment, the processor 400 may be substantially the same as the processor 120 of FIG. 1 or may be included in the processor 120. The communication circuit 410 may be substantially the same as the communication module 190 of FIG. 1 or may be included in the communication module 190. The camera module 420 may be may be substantially the same as the camera module 180 of FIG. 1 or may be included in the camera module 180. The display device 430 may be substantially the same as the display device 160 of FIG. 1 or may be included in the display device 160. The sensor module 440 may be substantially the same as the sensor module 176 of FIG. 1 or may be included in the sensor module 176. According to an embodiment, the processor 400 may control at least one of the operatively connected, directly or indirectly, communication circuit 410, camera module 420, display device 430, or sensor module 440.

According to various embodiments, the processor 400, comprising processing circuitry, may provide the augmented reality service. According to an embodiment, when the communication connection with the first electronic device 200 is made through the communication circuit 410, the processor 400 may control the communication circuit 410 to transmit image information acquired through the camera module 420 to the first electronic device 200. For example, when the augmented reality service is maintained, the image information acquired through the camera module 420 may be continuously or periodically transmitted to the first electronic device 200 through the communication circuit 410. For example, the image information acquired through the camera module 420 may include image information related to the real space corresponding to the FOV of the user wearing the second electronic device 210.

According to an embodiment, the processor 400 may control the display device 430 such that the virtual object is shown as being added to at least a part of the real space corresponding to the FOV of the user wearing the second electronic device 210. For example, the processor 400 may identify at least one of graphic characteristics (for example, form, size, or color) or the location of the virtual object based on information related to the virtual object provided from the first electronic device 200. The processor 400 may control the display device 430 to output the virtual object corresponding to the graphic characteristics to the location of the virtual object. For example, the virtual object may include at least one of information related to an external object located in the real space corresponding to the FOV of the user wearing the second electronic device 210 or content related to the application program executed in the first electronic device 200.

According to various embodiments, the processor 400 may control the communication circuit 410 to transmit at least one piece of information on the user's gaze detected through the sensor module 440 or information related to motion of the second electronic device 210 to the first electronic device 200. According to an embodiment, the processor 400 may continuously or periodically transmit at least one piece of the information on the user's gaze or the information related to motion of the second electronic device 210 to the first electronic device 200 through the communication circuit 410. For example, the information on the user's gaze may be configured based on at least one of head gaze or eye gaze. For example, the head gaze corresponds to motion of the head of the user wearing the second electronic device 210 and may be configured based on the center of the display device 430 or the center of a real-time image acquired through the camera module 420 (for example, an external camera). For example, the eye gaze may be configured based on motion of pupils acquired through the sensor module 440 (for example, an eye tracking sensor).

According to various embodiments, the communication circuit 410 may support the performance of at least one of wired or wireless communication between the first electronic device 200 and the second electronic device 210. For example, wired communication may include a USB scheme. For example, wireless communication may include a short-range communication scheme or cellular communication.

According to various embodiments, the camera module 420 may capture at least one of a still image or a moving image. According to an embodiment, the camera module 420 may include at least one of a first camera (for example, a RGB (red green blue) camera or a depth camera) for capturing an image related to the real space corresponding to the FOV of the user wearing the second electronic device 210 and a second camera (for example, a simultaneous localization and mapping (SLAM) camera) for recognizing a surrounding space of the second electronic device 210 (or user).

According to various embodiments, the display device 430 may display at least one virtual object related to the augmented reality service. According to an embodiment, the display device 430 may be configured by a transparent element so that the user wearing the second electronic device 210 can recognize the real space through the display device 430. The display device 430 may display at least one virtual object within an area corresponding to the FOV of the user so that the virtual object is shown as being added to at least a part of the real space by the user wearing the second electronic device 210. For example, the FOV of the user may include an angle or a range within which the user can recognize an object without turning his/her head or pupils while the user is gazing the front. For example, the area corresponding to the FOV of the user may include all or some of the areas of the display device 430. Further, the area corresponding to the FOV of the user may be configured or controlled based on a distance from the user's eyes to the display device 430.

According to various embodiments, the sensor module 440 may detect an operation state and an external environment state of the second electronic device 210 and provide the detected information to the processor 400. According to an embodiment, the sensor module 440 may include a motion sensor for detecting motion of the second electronic device 210 (or user). For example, the motion sensor may include at least one of an acceleration sensor, a tilt sensor, a gyro sensor, or a magnetic field sensor (3-axis magnetic sensor). According to an embodiment, the sensor module 440 may include a location sensor (for example, global navigation satellite system (GNSS)) for detecting location information of the second electronic device 210. According to an embodiment, the sensor module 440 may include a detection sensor (for example, a proximity sensor) for determining whether the user wears the second electronic device 210. According to an embodiment, the sensor module 440 may include a space sensor for recognizing an object included in the area corresponding to the FOV of the user wearing the second electronic device 210.

According to various embodiments, the second electronic device 210 may provide the augmented reality service independently from the first electronic device 200. According to an embodiment, the processor 400 may control the display device 430 to output at least one virtual object related to the augmented reality service. For example, the processor 400 may acquire (or generate) at least one virtual object based on image information acquired through the camera module 420. For example, the processor 400 may acquire (or generate) at least one virtual object related to the application program executed in the second electronic device 210. For example, the processor 400 may control the display device 430 such that at least one virtual object is shown as being added to at least a part of the real space corresponding to the FOV of the user.

According to an embodiment, the processor 400 may determine whether to interwork with the first electronic device 200 while the augmented reality service is provided. For example, the processor 400 may determine whether to interwork with the first electronic device 200 based on the communication connection with the first electronic device 200. For example, when the communication connection with the first electronic device 200 is made through the communication circuit 410, the processor 400 may determine to interwork with the first electronic device 200. For example, when the communication connection with the first electronic device 200 is made through the communication circuit 410, the processor 400 may determine to not interwork with the first electronic device 200. For example, the processor 400 may determine whether to interwork with the first electronic device 200 based on information related to an external object located in the real space corresponding to the FOV of the user wearing the second electronic device 210. For example, when the external object related to the first electronic device 200 exists in the real space corresponding to the FOV of the user wearing the second electronic device 210, the processor 400 may determine to interwork with the first electronic device 200. For example, when the external object related to the first electronic device 200 does not exist in the real space corresponding to the FOV of the user wearing the second electronic device 210, the processor 400 may determine to not interwork with the first electronic device 200.

According to an embodiment, when it is determined to interwork with the first electronic device 200 while the augmented reality service is provided, the processor 400 may control the display device 430 to display the virtual object related to the first electronic device 200 based on the first electronic device 200 (for example, the location of the first electronic device 200). For example, when it is determined to interwork with the first electronic device 200, the processor 400 may control the display device 430 to remove displaying of the virtual object related to the augmented reality service. For example, the processor 400 may generate the virtual object related to the first electronic device 200 based on information related to the application program executed in the first electronic device 200 provided from the communication circuit 410. For example, the location of the virtual object related to the first electronic device 200 may be configured based on the first electronic device 200 (for example, the location of the first electronic device 200). For example, the processor 400 may control the display device 430 to display the virtual object related to the first electronic device 200 based on the location configured based on the first electronic device 200.

According to an embodiment, the processor 400 may change the reference for displaying the virtual object related to the first electronic device 200. For example, the processor 400 may identify an input corresponding to the virtual object related to the first electronic device 200 based on image information acquired through the camera module 420. For example, when the input (for example, gesture) detected based on the image information acquired through the camera module 420 is associated with the virtual object related to the first electronic device 200, the processor 400 may control the display device 430 to display guide information related to the display reference of the virtual object related to the first electronic device 200. For example, when the location (for example, display location) of the virtual object related to the first electronic device 200 is changed based on the input (for example, gesture) detected based on the image information acquired through the camera module 420, the processor 400 may configure (or change) the reference for displaying the virtual object related to the first electronic device 200 based on the changed location of the virtual object related to the first electronic device 200. For example, the reference for displaying the virtual object may be changed based on at least one of the user, the second electronic device 210, an external object, a background, or another electronic device.

According to various embodiments, a first electronic device (for example, the electronic device 101 of FIG. 1 or the first electronic device 200 of FIG. 2) may include a communication circuit (for example, the communication module 190 of FIG. 1 or the communication circuit 310 of FIG. 3) and a processor (for example, the processor 120 of FIG. 1 or the processor 300 of FIG. 3) operatively connected, directly or indirectly, to the communication circuit, and the processor may be configured to establish (or make) a communication connection with a second electronic device through the communication circuit, transmit information related to a first virtual object displayed based on a location of the first electronic device to the second electronic device via the established communication connection when it is determined that a user wearing the second electronic device uses the first electronic device, and change a reference for displaying the first virtual object based on an input related to the first virtual object.

According to various embodiments, the processor may be configured to detect an external object located in a real space corresponding to a field of view (FOV) of the user wearing the second electronic device based on image information received from the second electronic device through the communication circuit, acquire a second virtual object corresponding to the external object, and transmit information on the second virtual object to the second electronic device through the communication circuit.

According to various embodiments, the processor may be configured to, when it is determined that the user wearing the second electronic device uses the first electronic device, transmit information related to hiding of the second virtual object to the second electronic device through the communication circuit.

According to various embodiments, the processor may be configured to perform user authentication based on the communication connection with the second electronic device.

According to various embodiments, the first virtual object may include at least one virtual object related to an application program executed in the first electronic device.

According to various embodiments, the electronic device may further include a display device (for example, the display device 160 of FIG. 1 or the display device 320 of FIG. 3), and the processor may be configured to determine whether the user uses the first electronic device based on at least one of whether the display device is activated, execution information of an application program, whether information related to the first electronic device is included in an area corresponding to an FOV of the user wearing the second electronic device, or location information of the first electronic device and the second electronic device.

According to various embodiments, the information related to the first virtual object includes information related to coordinates for displaying the first virtual object in a coordinate system based on the location of the first electronic device.

According to various embodiments, the information related to the first virtual object includes at least one of a relative direction or a relative separation distance for displaying the first virtual object based on the location of the first electronic device.

According to various embodiments, the processor may be configured to identify an input related to the first virtual object based on image information received from the second electronic device through the communication circuit and change the reference for displaying the first virtual object based on the input related to the first virtual object.

According to various embodiments, the processor may be configured to, when the location of the first virtual object is changed within an area corresponding to an FOV of the user wearing the second electronic device based on the input related to the first virtual object, change the reference for displaying the first virtual object based on the changed location of the first virtual object.

According to various embodiments, the reference for displaying the first virtual object may include at least one of the first electronic device, coordinates of a real space, an external object located within an area corresponding to an FOV of the user wearing the second electronic device, the user, or a third electronic device.

According to various embodiments, the information related to the first virtual object may include at least one of a form, a size, a color, or a location of the first virtual object.

According to various embodiments, a second electronic device (for example, the electronic device 101 of FIG. 1 or the second electronic device 210 of FIG. 2) may include a communication circuit (for example, the communication module 190 of FIG. 1 or the communication circuit 410 of FIG. 4), a camera module (for example, the camera module 180 of FIG. 1 or the camera module 420 of FIG. 4), a display device (for example, the display device 160 of FIG. 1 or the display device 430 of FIG. 4), and a processor (for example, the processor 120 of FIG. 1 or the processor 400 of FIG. 4) operatively connected to the communication circuit, the camera module, and the display device, and the processor may be configured to, when a communication connection with a first electronic device is made through the communication circuit and it is determined to interwork with the first electronic device, acquire a first virtual object related to the first electronic device, output the first virtual object within an area corresponding to an FOV of a user wearing the second electronic device based on a location of the first electronic device, and change a reference for displaying the first virtual object based on an input related to the first virtual object.

According to various embodiments, the processor may be configured to detect an external object located in a real space corresponding to the FOV of the user wearing the second electronic device based on image information acquired through the camera module and output a second virtual object corresponding to the external object.

According to various embodiments, the processor may be configured to, when it is determined to interwork with the first electronic device, limit the output of the second virtual object.

According to various embodiments, the first virtual object may include at least one virtual object related to an application program executed in the first electronic device.

According to various embodiments, the processor may be configured to determine whether to interwork with the first electronic device based on at least one of whether communication connection with the first electronic device is made, whether information related to the first electronic device is included in the area corresponding to the FOV of the user wearing the second electronic device, or location information of the first electronic device and the second electronic device.

According to various embodiments, the processor may be configured to output the first virtual object based on a coordinate system based on the location of the first electronic device.

According to various embodiments, the processor may be configured to output the first virtual object based on at least one of a relative direction or a relative separate distance configured based on the location of the first electronic device.

According to various embodiments, the processor may be configured to identify the input related to the first virtual object based on the image information acquired through the camera module and change the reference for displaying the first virtual object based on the input related to the first virtual object.

According to various embodiments, the processor may be configured to, when the location of the first virtual object is changed within an area corresponding to the FOV of the user wearing the second electronic device based on the input related to the first virtual object, change the reference for displaying the first virtual object based on the changed location of the first virtual object.

According to various embodiments, the reference for displaying the first virtual object may include at least one of the first electronic device, coordinates of a real space, an external object located within an area corresponding to the FOV of the user wearing the second electronic device, the user, or a third electronic device.

Figure 5:
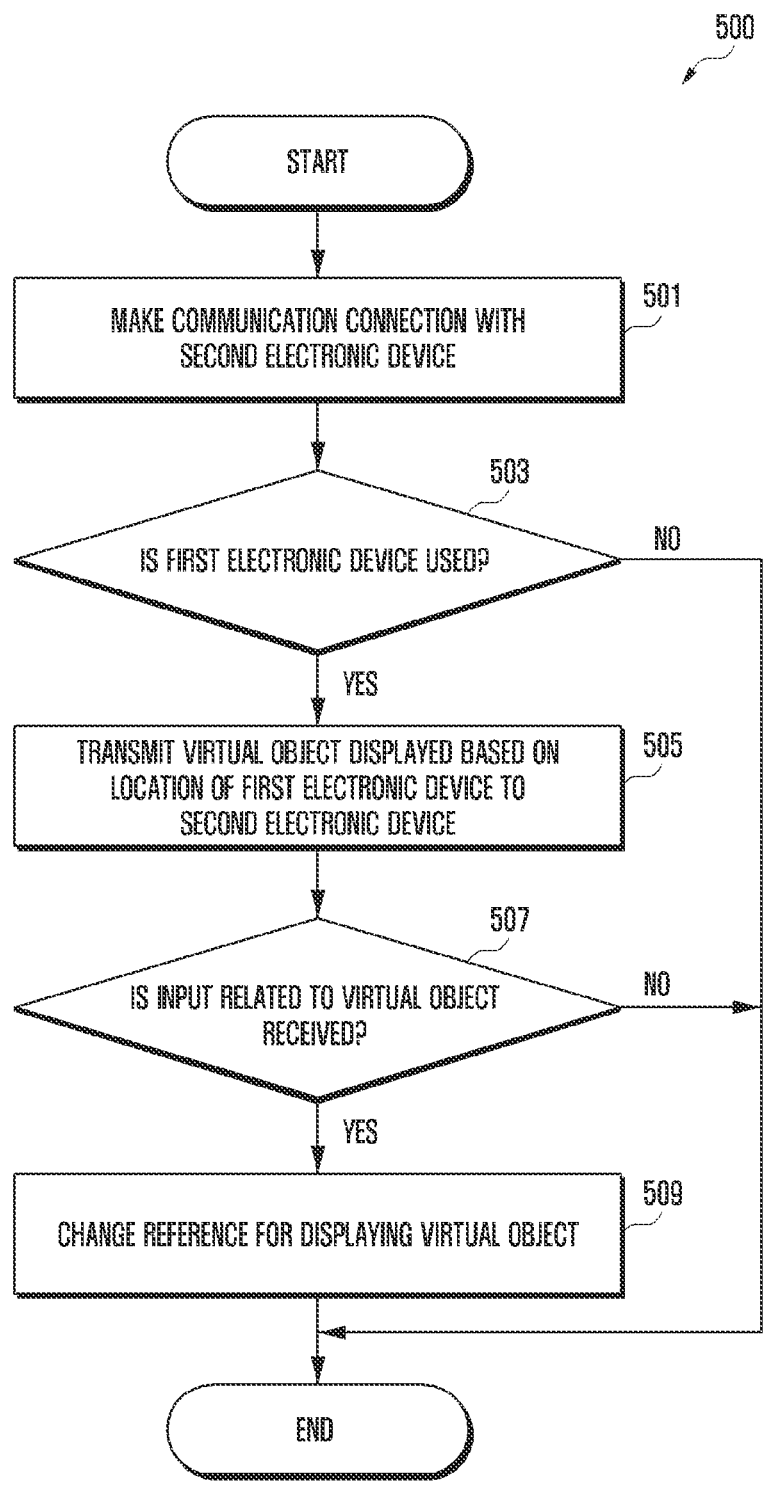
FIG. 5 is a flowchart illustrating a process in which the first electronic device controls the output of the virtual object according to various example embodiments.

FIG. 5 is a flowchart 500 illustrating an operation in which the first electronic device controls the output of the virtual object according to various embodiments. In the following embodiment, operations may be sequentially performed but the sequential performance is not necessary. For example, the order of operations may be changed, and at least two operations may be performed in parallel. For example, the first electronic device of FIG. 5 may be the electronic device 101 of FIG. 1 or the first electronic device 200 of FIG. 2 or FIG. 3.

Referring to FIG. 5, according to various embodiments, the first electronic device (for example, the processor 120 or the communication module 190 of FIG. 1 or the processor 300 or the communication circuit 310 of FIG. 3) may establish a wired or wireless communication connection with the second electronic device (for example the second electronic device 210 of FIG. 2) in operation 501. According to an embodiment, the processor 300 may control the communication circuit 310 to establish a communication link (or a communication channel) between the first electronic device 200 and the second electronic device 210. According to an embodiment, when the communication link with the second electronic device 210 is established, the processor 300 may detect at least one virtual object related to the augmented reality service based on image information related to the real space received from the second electronic device 210 through the communication link. The processor 300 may control the communication circuit 310 to transmit information related to at least one virtual object to the second electronic device 210. For example, the information related to the virtual object may include at least one of the form (or shape), color, size, or location of the virtual object. For example, the virtual object may include at least one of information related to the external object located in the real space corresponding to the FOV of the user wearing the second electronic device 210 or information related to the application program executed in the first electronic device 200.

According to various embodiments, the first electronic device (for example, the processor 120 or 300) may identify whether the first electronic device (for example, the first electronic device 200 of FIG. 2) is additionally used to execute a separate function (for example, a music reproduction function) while the augmented reality service using the second electronic device (for example, the second electronic device 210) is provided in operation 503. According to an embodiment, the processor 300 may determine whether an application program different from the application program related to the augmented reality service is executed, whether the display device 320 is activated, whether an external object related to the first electronic device 200 exists in an area corresponding to the FOV of the user wearing the second electronic device 210, or whether the first electronic device 200 is additionally used to execute another separate function while the augmented reality service is provided based on at least one piece of location information of the first electronic device 200 and the second electronic device 210. According to an embodiment, when it is determined that the first electronic device (for example, the first electronic device 200 of FIG. 2) is not additionally used to execute a separate function different from the augmented reality service (for example, "No" of operation 503), the first electronic device (for example, the processor 120 or 300) may end the operation according to an embodiment.

According to various embodiments, when it is determined that the first electronic device (for example, the first electronic device 200) is additionally used to execute a separate function different from the augmented reality service (for example, "Yes" of operation 503), the first electronic device (for example, the processor 120 or 300) may transmit information related to the virtual object displayed based on the location of the first electronic device (for example, the first electronic device 200) to the second electronic device in operation 505. According to an embodiment, when it is determined that the first electronic device 200 is additionally used to execute another separate function while the augmented reality service using the second electronic device 210 is provided, the processor 300 may generate a virtual object related to the first electronic device 200. For example, the virtual object related to the first electronic device 200 may include a virtual object related to an application program different from the application program related to the augmented reality service executed in the first electronic device 200 and a virtual object related to content displayed in the display device 320 of the first electronic device 200. For example, the location of the virtual object related to the first electronic device 200 may be configured based on the first electronic device 200 (for example, the location of the first electronic device 200). According to an embodiment, the processor 300 may control the communication circuit 310 to transmit information related to the virtual object to the second electronic device 210 such that the virtual object related to the first electronic device 200 is shown as being added to the location configured based on the first electronic device 200 in the real space corresponding to the FOV of the user. For example, the location of the virtual object configured based on the first electronic device 200 is a relative location configured based on the location of the first electronic device 200 and may be changed based on a change in the location of the first electronic device 200.

According to various embodiments, the first electronic device (for example, the processor 120 or 300) may identify whether an input corresponding to the virtual object related to the first electronic device (for example, the first electronic device 200) is received in operation 507. According to an embodiment, the processor 300 may detect a gesture based on image information received from the second electronic device 210 through the communication circuit 310. According to an embodiment, the processor 300 may identify whether the gesture detected based on the image information received from the second electronic device 210 is associated with the virtual object related to the first electronic device 200. For example, the processor 300 may compare the location (for example, display location) of the virtual object related to the first electronic device 200 and the location of the gesture and determine whether the gesture is associated with the virtual object related to the first electronic device 200. According to an embodiment, when the input corresponding to the virtual object related to the first electronic device (for example, the first electronic device 200 of FIG. 2) is not received (for example, "No" of operation 507), the first electronic device (for example, the processor 120 or 300) may end the operation according to an embodiment.

According to various embodiments, when the input (for example, gesture) corresponding to the virtual object related to the first electronic device (for example, the first electronic device 200 of FIG. 2) is received (for example, "Yes" of operation 507), the first electronic device (for example, the processor 120 or 300) may change the reference for displaying the virtual object related to the first electronic device (for example, the first electronic device 200) based on the input corresponding to the virtual object in operation 509. According to an embodiment, when the location (for example, the display location) of the virtual object related to the first electronic device 200 is changed based on the input (for example, gesture) related to the augmented reality service, the processor 300 may configure the reference for displaying the virtual object related to the first electronic device 200 based on the changed location of the virtual object related to the first electronic device 200. For example, the reference for displaying the virtual object may be configured as at least one of a user, an external object, a background, the first electronic device 200, or another electronic device.

Figure 6:
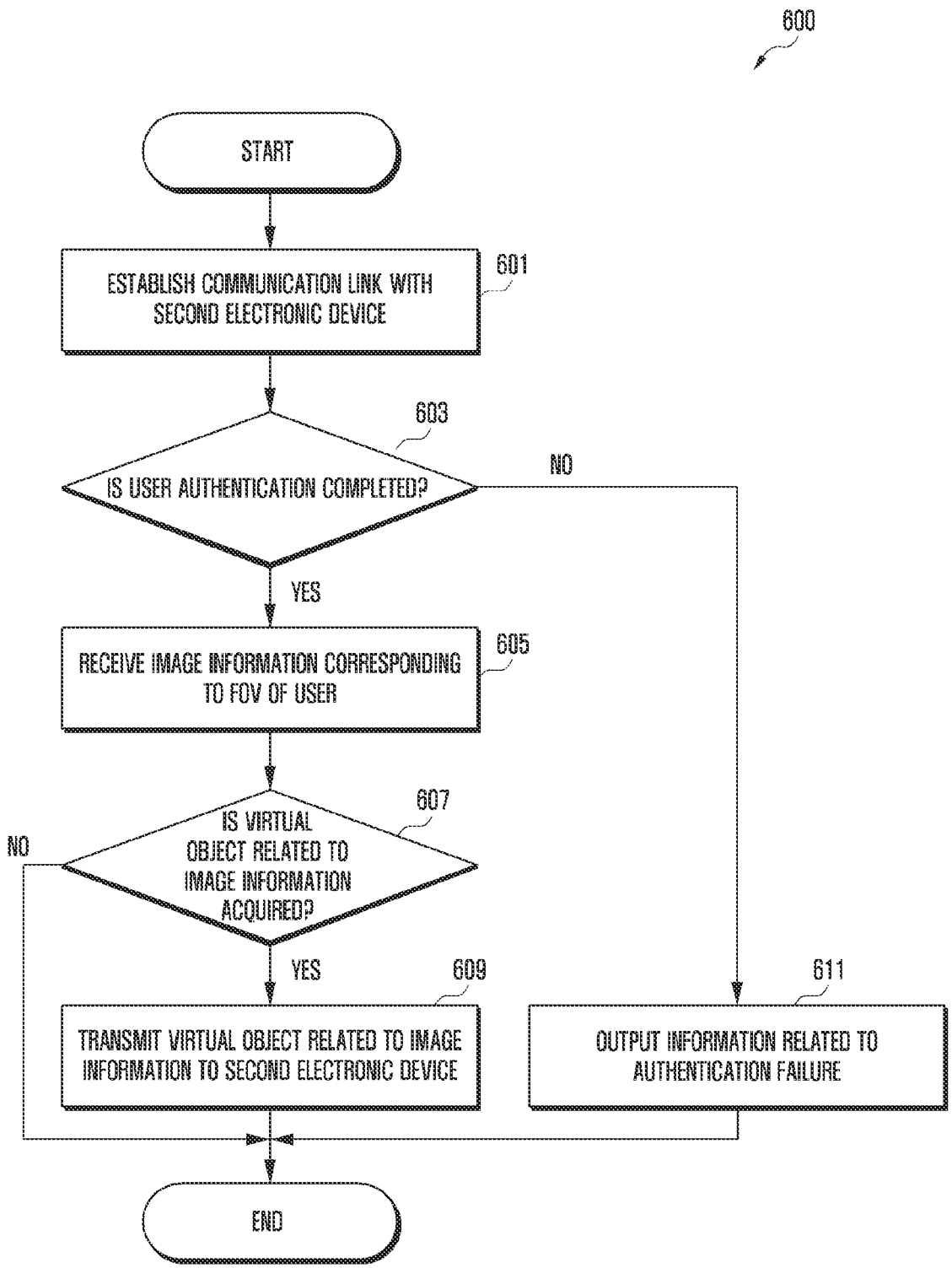
FIG. 6 is a flowchart illustrating a process in which the first electronic device transmits the virtual object to the second electronic device according to various example embodiments.
Figure 7A:
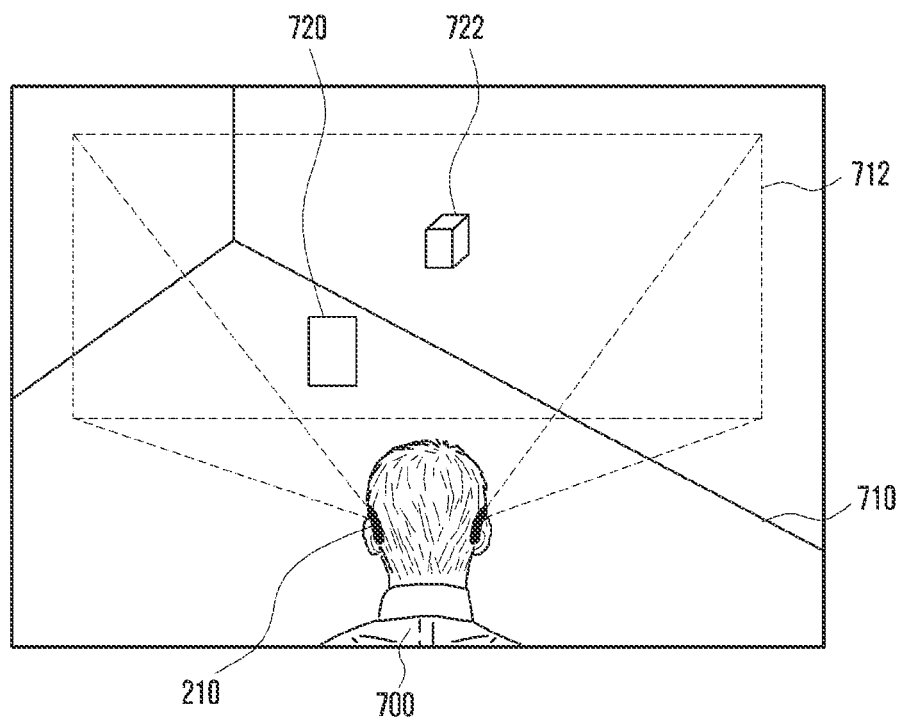
FIGS. 7A and 7B illustrate screen configurations for displaying virtual objects according to various example embodiments.
Figure 7B:
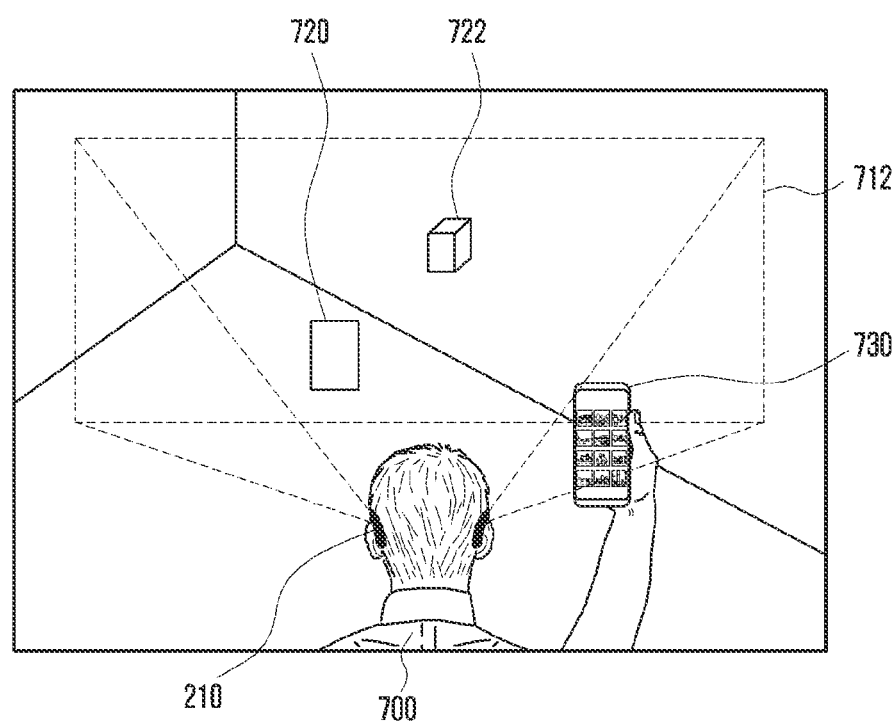

FIG. 6 is a flowchart 600 illustrating a process in which the first electronic device transmits a virtual object to the second electronic device according to various embodiments. According to an embodiment, operations of FIG. 6 may be an embodiment of operation 501 of FIG. 5. In the following embodiment, operations may be sequentially performed but the sequential performance is not necessary. For example, the order of operations may be changed, and at least two operations may be performed in parallel. For example, the first electronic device of FIG. 5 may be the electronic device 101 of FIG. 1 or the first electronic device 200 of FIG. 2 or FIG. 3. For example, at least some configurations of FIG. 6 are described with reference to FIGS. 7A and 7B. FIGS. 7A and 7B illustrate screen configurations for displaying virtual objects according to various embodiments.

Referring to FIG. 6, according to various embodiments, the first electronic device (for example, the processor 120 or the communication module 190 (comprising communication circuitry) of FIG. 1, and/or the processor 300, and/or the communication circuit 310 of FIG. 3) may establish a communication link with the second electronic device (for example, the second electronic device 210 of FIG. 2) in operation 601. According to an embodiment, the processor 300 may control the communication circuit 310 to establish a wireless communication link or a wired communication link between the first electronic device 200 and the second electronic device 210.

According to various embodiments, the first electronic device (for example, the processor 120 or 300) may identify whether user authentication is completed (for example, whether authentication is successful) in operation 603. According to an embodiment, when communication connection with the second electronic device 210 is made, the processor 300 may perform user authentication. For example, when the communication link with the second electronic device 210 is established, the processor 300 may control the display device 320 to display information related to user authentication. The processor 300 may identify whether user authentication is successful based on a user input received according to information related to user authentication displayed in the display device 320 and reference authentication information stored in the memory 340. For example, the user authentication may include at least one of a password type, a pattern input type, or a biometric recognition type (for example, iris recognition, fingerprint recognition, or vein recognition). For example, the reference authentication information may include at least one of an authentication password, an authentication pattern, and pre-registered biometric information as information predefined for user authentication.

According to various embodiments, when the user authentication is completed (for example, "Yes" of operation 603), the first electronic device (for example, the processor 120 or 300) may receive image information related to the real space corresponding to the FOV of the user from the second electronic device (for example, the second electronic device 210) in operation 605. According to an embodiment, when the user authentication is completed (for example, when the authentication is successful), the processor 300 may execute an application program related to the augmented reality service to switch to the augmented reality mode. When having switched to the augmented reality mode, the processor 300 may control the communication circuit 310 to transmit information related to the augmented reality service to the second electronic device 210. The processor 300 may receive image information related to the real space corresponding to the FOV of the user wearing the second electronic device 210 from the second electronic device 210 through the communication circuit 310 in response to information related to the augmented reality service. For example, the information related to the augmented reality service may include information indicating the start of the augmented reality service. For example, the processor 300 may control the display device 320 to be deactivated based on switching to the augmented reality mode.

According to various embodiments, the first electronic device (for example, the processor 120 or 300) may identify whether at least one virtual object related to image information is acquired in operation 607. According to an embodiment, the processor 300 may identify an external object located in the real space corresponding to the field of view (FOV) of the user wearing the second electronic device 210 based on the image information received from the second electronic device 210. The processor 300 may identify whether there is an external object to which the virtual object is mapped among external objects located in the real space corresponding to the FOV of the user. For example, when there is the external object to which the virtual object is mapped among the external objects located in the real space corresponding to the FOV of the user, the processor 300 may determine that at least one virtual object related to the image information is acquired. For example, when there is no external object to which the virtual object is mapped among the external objects located in the real space corresponding to the FOV of the user, the processor 300 may determine that at least one virtual object related to the image information is not acquired. According to an embodiment, when at least one virtual object related to the image information is not acquired (for example, "No" of operation 607), the first electronic device (for example, the processor 120 or 300) may end the operation according to an embodiment.

According to various embodiments, when at least one virtual object related to the image information is acquired (for example, "Yes" of operation 607), the first electronic device (for example, the processor 120 or 300) may transmit information on at least one virtual object related to the image information to the second electronic device in operation 609. According to an embodiment, the processor 300 may control the communication circuit 310 to transmit information on at least one virtual object related to the image information provided from the second electronic device 210 to the second electronic device 210. For example, the information related to the virtual object may include at least one of the form (or shape), color, size, or location of the virtual object.

According to an embodiment, referring to FIG. 7A, the second electronic device 210 may perform the output such that at least one of virtual object 1 720 or virtual object 2 722 is added to at least a part 712 of a real space 710 corresponding to the FOV of a user 700 wearing the second electronic device 210 based on information related to the virtual object provided from the first electronic device 200.

According to various embodiments, when user authentication is not completed (for example, when authentication fails) (for example, "No" of operation 603), the first electronic device (for example, the processor 120 or 300) may output information related to authentication failure in operation 611. According to an embodiment, when user authentication fails, the processor 300 may control the display device 320 to display information related to authentication failure. For example, the information related to authentication failure may include at least one piece of re-authentication request information or authentication failure information.

According to various embodiments, when user authentication is completed (for example, "Yes" of operation 603), the first electronic device (for example, the processor 120 or 300) may generate the virtual object related to the application program executed in the first electronic device 200 and transmit the virtual object to the second electronic device 210 although it is not illustrated.

Figure 8:
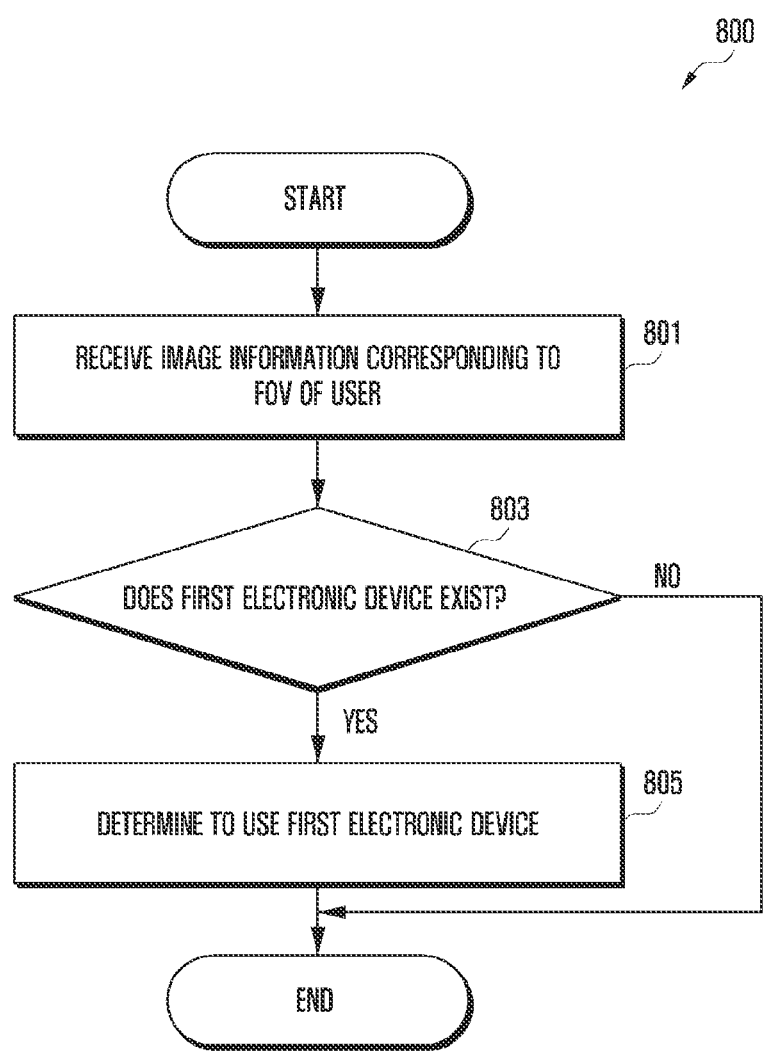
FIG. 8 is a flowchart illustrating a process in which the first electronic device determines the use of the first electronic device based on image information according to various example embodiments.

FIG. 8 is a flowchart 800 illustrating a process in which the first electronic device determines the use of the first electronic device based on image information according to various embodiments. According to an embodiment, operations of FIG. 8 may be an embodiment of operation 503 of FIG. 5. In the following embodiment, operations may be sequentially performed but the sequential performance is not necessary. For example, the order of operations may be changed, and at least two operations may be performed in parallel. For example, the first electronic device of FIG. 8 may be the electronic device 101 of FIG. 1 or the first electronic device 200 of FIG. 2 or FIG. 3.

Referring to FIG. 8, according to various embodiments, when a communication connection with the second electronic device (for example, the second electronic device 210) is made (for example, operation 501 of FIG. 5), the first electronic device (for example, the processor 120 or the communication module 190 of FIG. 1 or the processor 300 or the communication circuit 310 of FIG. 3) may receive image information corresponding to the FOV of the user from the second electronic device (for example, the second electronic device 210) in operation 801. According to an embodiment, switching to the augmented reality mode is performed based on the communication connection with the second electronic device 210, the processor 300 may periodically or continuously receive image information from the second electronic device 210 through the communication circuit 310.

According to various embodiments, the first electronic device (for example, the processor 120, 200, and/or 300) may identify whether the first electronic device (for example, the first electronic device 200) is located in at least a part of the real space corresponding to the FOV of the user in operation 803. According to an embodiment, the processor 300 may detect at least one external object located in the real space corresponding to the FOV of the user wearing the second electronic device 210 based on image information received from the second electronic device 210. The processor 300 may identify whether there is an external object related to the first electronic device 200 among at least one external object located in at least a part of the real space corresponding to the FOV of the user. For example, the external object related to the first electronic device 200 may include at least one of external objects corresponding to all or some of the exterior configurations of the first electronic device 200 or external objects related to content displayed in the display device 320. According to an embodiment, when the first electronic device (for example, the first electronic device 200) is not located in at least the part of the real space corresponding to the FOV of the user (for example, "No" of operation 803), the first electronic device (for example, the processor 120 or 300) may end the operation according to an embodiment. For example, when there is no external object related to the first electronic device 200 in the area corresponding to the FOV of the user wearing the second electronic device 210, the processor 300 may determine that the first electronic device 200 is not used.

According to various embodiments, when the first electronic device (for example, the first electronic device 200) is located in at least the part of the real space corresponding to the FOV of the user (for example, "Yes" of operation 803), the first electronic device (for example, the processor 120 or 300) may determine that the first electronic device (for example, the first electronic device 200) is additionally used to execute another separate function while the augmented reality service is provided in operation 805. According to an embodiment, when an external object 730 related to the first electronic device 200 exists in at least the part 712 of the real space corresponding to the FOV of the user 700 wearing the second electronic device 210 as illustrated in FIG. 7B, the processor 300 may determine that the first electronic device 200 is additionally used to execute another separate function while the augmented reality service is provided.

According to various embodiments, the first electronic device (for example, the processor 120 or 300) may determine whether the first electronic device 200 is additionally used in further consideration of location information of the first electronic device 200 and the second electronic device 210. According to an embodiment, when the first electronic device (for example, the first electronic device 200) is located in the real space corresponding to the FOV of the user (for example, "Yes" of operation 803), the processor 300 may identify whether the first electronic device 200 is located within a reference range from the second electronic device 210 based on the location information of the first electronic device 200 and the second electronic device 210. For example, when the first electronic device 200 is located in the real space corresponding to the FOV of the user and the first electronic device 200 is located with the reference range of the second electronic device 210, the processor 300 may determine that the first electronic device 200 is additionally used to execute another separate function while the augmented reality service is provided. For example, when the first electronic device 200 is not located in the real space corresponding to the FOV of the user or the first electronic device 200 escapes the reference range of the second electronic device 210, it may be determined that a separate function using the first electronic device 200 is not executed while the augmented reality service is provided.

Figure 9:
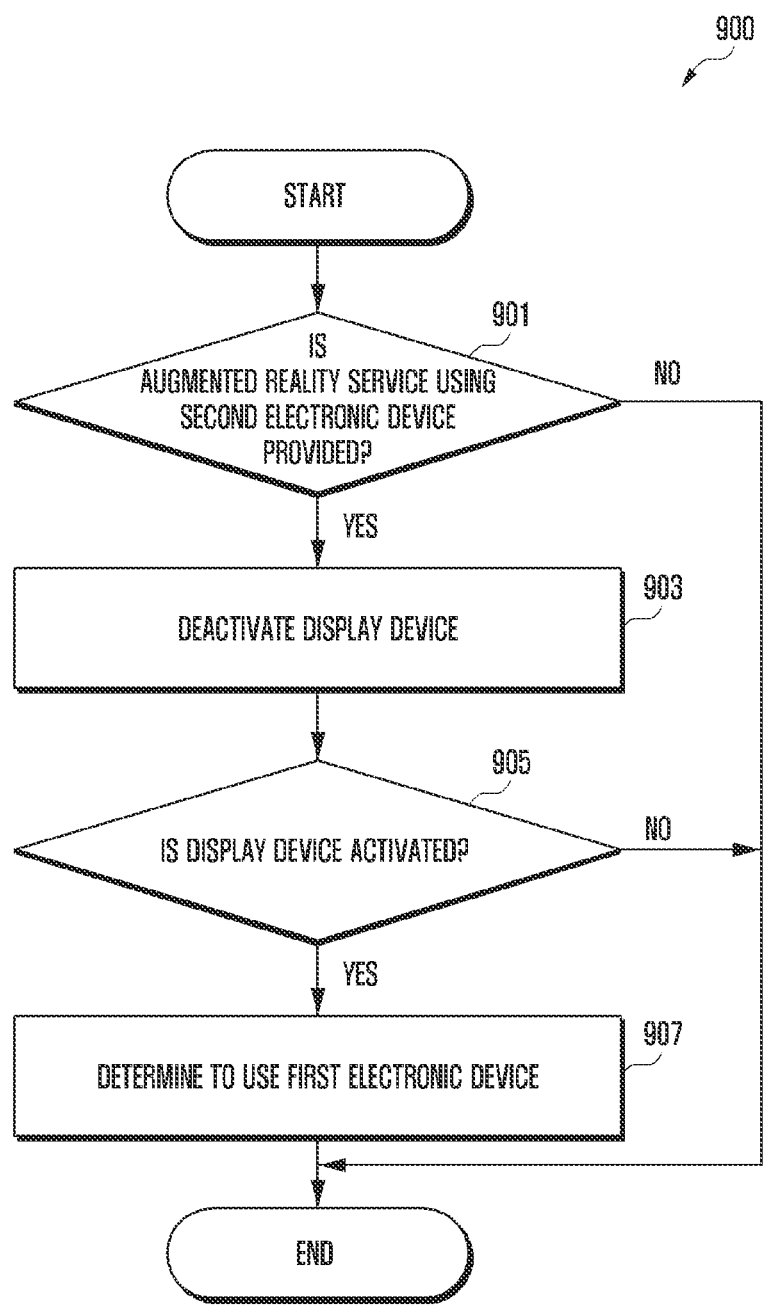
FIG. 9 is a flowchart illustrating a process in which the first electronic device determines the use of the first electronic device based on whether a display device is activated according to various example embodiments.

FIG. 9 is a flowchart 900 illustrating a process in which the first electronic device determines the use of the first electronic device based on whether the display device is activated according to various embodiments. According to an embodiment, operations of FIG. 9 may be an embodiment of operation 503 of FIG. 5. In the following embodiment, operations may be sequentially performed but the sequential performance is not necessary. For example, the order of operations may be changed, and at least two operations may be performed in parallel. For example, the first electronic device of FIG. 9 may be the electronic device 101 of FIG. 1 or the first electronic device 200 of FIG. 2 or FIG. 3.

Referring to FIG. 9, according to various embodiments, when the communication connection with the second electronic device (for example, the second electronic device 210) is made (for example, operation 501 of FIG. 5), the first electronic device (for example, the processor 120 of FIG. 1 or the processor 300 of FIG. 3) may determine whether to provide the augmented reality service using the second electronic device (for example, the second electronic device 210) in operation 901. According to an embodiment, when user authentication is completed as illustrated in operation 603 of FIG. 6, the processor 300 may determine to provide the augmented reality service using the second electronic device 210. According to an embodiment, when switching to the augmented reality mode is performed based on the communication connection with the second electronic device 210, the processor 300 may determine to provide the augmented reality service using the second electronic device 210. According to an embodiment, when the application program related to the augmented reality service is executed based on the communication connection with the second electronic device 210, the processor 300 may determine to provide the augmented reality service using the second electronic device 210. According to an embodiment, when it is determined to not provide the augmented reality service using the second electronic device (for example, the second electronic device 210) (for example, "No" of operation 901), the first electronic device (for example, the processor 120 or 300) may end the operation according to an embodiment.

According to various embodiments, when it is determined to provide the augmented reality service using the second electronic device (for example, the second electronic device 210) (for example, "Yes" of operation 901), the first electronic device (for example, the processor 120 or 300) may switch the display device (for example, the display device 320) to an inactive state in operation 903. According to an embodiment, the processor 300 may switch to the augmented reality mode in order to provide the augmented reality service using the second electronic device (for example, the second electronic device 210). In this case, the processor 300 may control the display device 320 to make the display device 320 deactivated based on the augmented reality mode.

According to various embodiments, the first electronic device (for example, the processor 120 or 300) may identify whether the display device (for example, the display device 320) in the inactive state switches to an active state in operation 905. For example, the display device 320 in the inactive state may be activated based on a user input related to driving of the first electronic device 200 or a control command of the application program. According to an embodiment, when the display device (for example, the display device 320) maintains the inactive state (for example, "No" of operation 905), the first electronic device (for example, the processor 120 or 300) may end the operation according to an embodiment.

According to various embodiments, when the display device (for example, the display device 320) switches to the active state (for example, "Yes" of operation 905), the first electronic device (for example, the processor 120 or 300) may determine to additionally use the first electronic device (for example, the first electronic device 200) to execute another separate function while the augmented reality service is provided in operation 907. According to an embodiment, when the display device 320 in the inactive state switches to the active state, the processor 300 may determine that the display device 320 has switched to the active state to execute another separate function while the augmented reality service is provided. Accordingly, the processor 300 may determine that the first electronic device 200 is additionally used to execute the separate function while the augmented reality service is provided.

According to various embodiments, when the display device 320 of the first electronic device 200 is activated while the augmented reality service is provided using the second electronic device 210 (for example, "Yes" of operation 905 in FIG. 9), the first electronic device 200 may determine that the first electronic device 200 is additionally used while the augmented reality service is provided regardless of whether the first electronic device 200 is located in the real space corresponding to the FOV of the user wearing the second electronic device 210.

According to various embodiments, when at least a part of the first electronic device 200 is located in the real space corresponding to the FOV of the user wearing the second electronic device 210 and the display device 320 of the first electronic device 200 is activated, the first electronic device 200 may determine that the first electronic device 200 is additionally used while the augmented reality service is provided.

Figure 10:
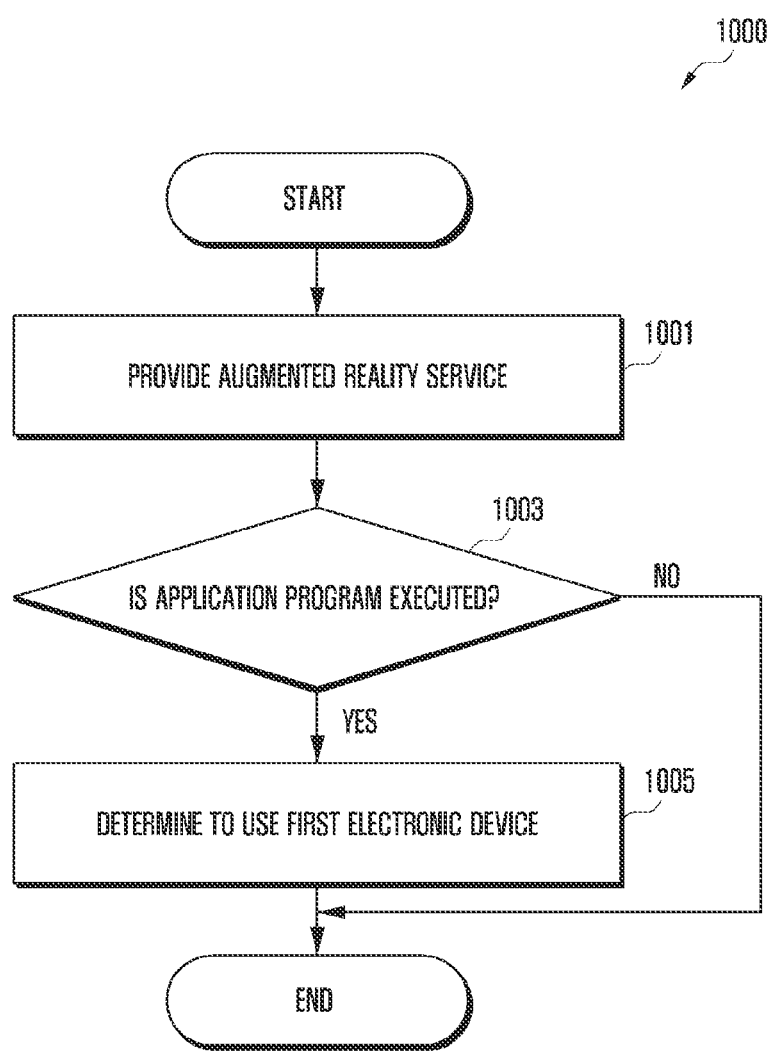
FIG. 10 is a flowchart illustrating a process in which the first electronic device determines the use of the first electronic device based on execution of an application program according to various example embodiments.

FIG. 10 is a flowchart 1000 illustrating a process in which the first electronic device determines the use of the first electronic device based on execution of an application program according to various embodiments. According to an embodiment, operations of FIG. 10 may be an embodiment of operation 503 of FIG. 5. In the following embodiment, operations may be sequentially performed but the sequential performance is not necessary. For example, the order of operations may be changed, and at least two operations may be performed in parallel. For example, the first electronic device of FIG. 10 may be the electronic device 101 of FIG. 1 or the first electronic device 200 of FIG. 2 or FIG. 3.

Referring to FIG. 10, according to various embodiments, when a communication connection with the second electronic device (for example, the second electronic device 210) is made (for example, operation 501 of FIG. 5), the first electronic device (for example, the processor 120 of FIG. 1 or the processor 300 of FIG. 3) may provide the augmented reality service using the second electronic device (for example, the second electronic device 210) in operation 1001. According to an embodiment, when the communication with the second electronic device 210 is made, the processor 300 may transmit information related to at least one virtual object to the second electronic device such that the information is shown as being added to at least a part of the real space corresponding to the FOV of the user wearing the second electronic device 210. For example, at least one virtual object may include information related to an external object located in the real space corresponding to the FOV of the user wearing the second electronic device 210.

According to various embodiments, the first electronic device (for example, the processor 120 or 300) may identify whether an application program different from the application program related to the augmented reality service is executed in operation 1003. According to an embodiment, the processor 300 may control the display device 320 to display a plurality of icons related to a plurality of application programs installed in the first electronic device 200. The processor 300 may execute an application program related to an icon for which a selection input is detected among the plurality of icons displayed on the display device 320. According to an embodiment, when the application program different from the application program related to the augmented reality service is not executed (for example, "No" of operation 1003), the first electronic device (for example, the processor 120 or 300) may end the operation according to an embodiment. For example, when the application program different from the application program related to the augmented reality service is not executed, the processor 300 may determine that a separate function using the first electronic device 200 is not executed while the augmented reality service is provided.

According to various embodiments, when the application program different from the application program related to the augmented reality service is executed (for example, "Yes" of operation 1003), the first electronic device (for example, the processor 120 or 300) may determine that the first electronic device (for example, the first electronic device 200) is additionally used to execute another separate function while the augmented reality service is provided in operation 1005. According to an embodiment, when an application program (for example, an Internet application program) different from the application program related to the augmented reality service is executed, the processor 300 may determine that the first electronic device 200 is additionally used to execute another separate function (for example, an Internet function) while the augmented reality service is provided.

According to various embodiments, when another application program is executed while the augmented reality service is provided using the second electronic device 210 (for example, "Yes" of operation 1003 in FIG. 10), the first electronic device 200 may determine that the first electronic device 200 is additionally used while the augmented reality service is provided regardless of whether the first electronic device 200 is located in the real space corresponding to the FOV of the user wearing the second electronic device 210.

According to various embodiments, when at least a part of the first electronic device 200 is located in the real space corresponding to the FOV of the user wearing the second electronic device 210 and another application program is executed, the first electronic device 200 may determine that the first electronic device 200 is additionally used while the augmented reality service is provided.

Figure 11:
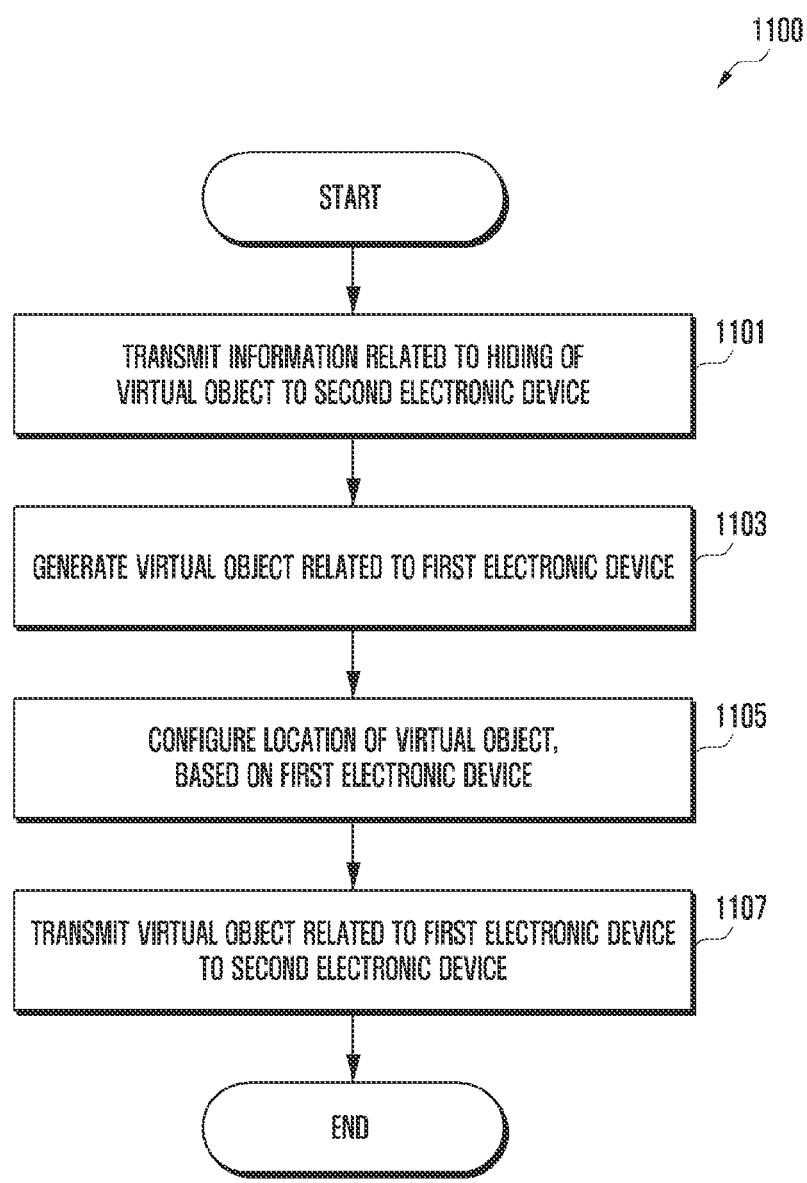
FIG. 11 is a flowchart illustrating a process in which the first electronic device transmits a virtual object related to the first electronic device to the second electronic device according to various example embodiments.
Figure 12A:
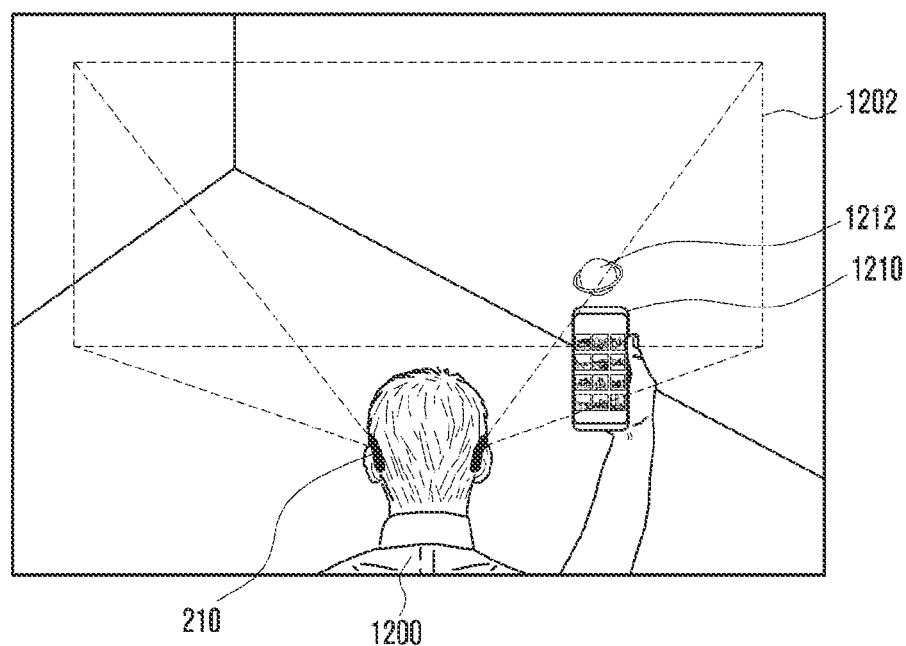
FIGS. 12A, 12B, and 12C illustrate screen configurations for displaying virtual objects related to the first electronic device according to various example embodiments.
Figure 12B:
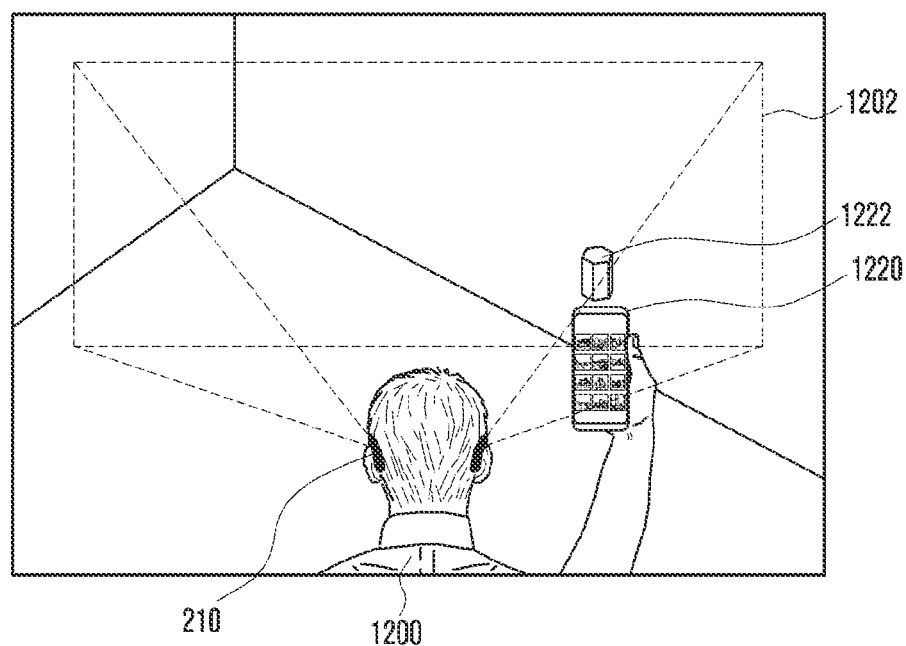
Figure 12C:
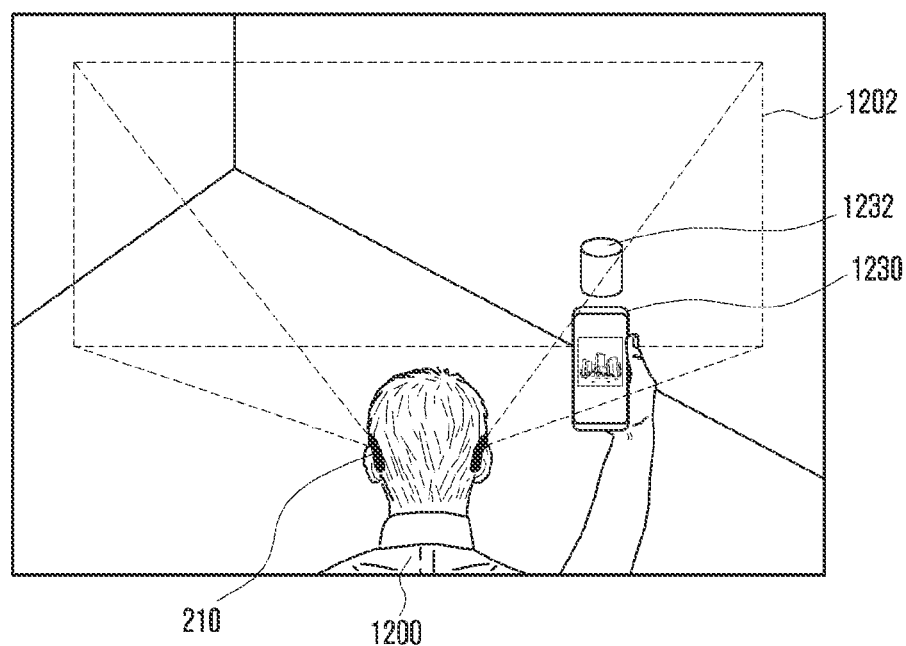

FIG. 11 is a flowchart 1100 illustrating a process in which the first electronic device transmits a virtual object related to the first electronic device to the second electronic device according to various embodiments. According to an embodiment, operations of FIG. 11 may be an embodiment of operation 505 of FIG. 5. In the following embodiment, operations may be sequentially performed but the sequential performance is not necessary. For example, the order of operations may be changed, and at least two operations may be performed in parallel. For example, the first electronic device of FIG. 11 may be the electronic device 101 of FIG. 1 or the first electronic device 200 of FIG. 2 or FIG. 3. For example, at least some elements of FIG. 11 will be described with reference to FIGS. 12A, 12B, and 12C. FIGS. 12A, 12B, and 12C illustrate screen configurations for displaying virtual objects related to the first electronic device according to various embodiments.

Referring to FIG. 11, according to various embodiments, when it is determined that the first electronic device (for example, the first electronic device 200) is additionally used for another separate function while the augmented reality service is provided (for example, "Yes" of operation 503 in FIG. 5), the first electronic device (for example, the processor 120 or the communication module 190 of FIG. 1 or the processor 300 or the communication circuit 310 of FIG. 3) may transmit information related to hiding of the virtual object to the second electronic device (for example, the second electronic device 210) in operation 1101. According to an embodiment, when it is determined that the first electronic device 200 is additionally used to execute another separate function while the augmented reality service using the second electronic device 210 is provided, the processor 300 may control the communication circuit 310 to transmit information related to hiding of the virtual object to the second electronic device 210. For example, the information related to hiding of the virtual object may include control information indicating the limit of output of at least one virtual object related to the augmented reality service. According to an embodiment, the second electronic device 210 may output at least one of virtual object 1 720 and virtual object 2 722 to be shown as being added to at least a part of the real space corresponding to the FOV of the user 700 as illustrated in FIG. 7A. The second electronic device 210 may limit (or stop) the output of at least one of virtual object 1 720 or virtual object 2 722 based on the information related to hiding of the virtual object received from the first electronic device 200 as illustrated in FIG. 12A. For example, the second electronic device 210 may output a virtual object 1212 for indicating the additional use of the first electronic device 200 to execute another separate function based on information related to hiding of the virtual object. For example, the virtual object 1212 may be output to a location adjacent to an external object 1210 related to the first electronic device 200 within at least a part 1202 of the real space corresponding to the FOV of a user 1200 wearing the second electronic device 210.

According to various embodiments, the first electronic device (for example, the processor 120 or 300) may generate at least one virtual object related to the first electronic device (for example, the first electronic device 200) in operation 1103. For example, the virtual object related to the first electronic device 200 may include a virtual object related to an application program different from the application program related to the augmented reality service executed in the first electronic device 200 and a virtual object related to content displayed in the display device 320.

According to various embodiments, the first electronic device (for example, the processor 120 or 300) may configure the location of at least one virtual object related to the first electronic device (for example, the first electronic device 200) based on the first electronic device (for example, the location of the first electronic device 200) in operation 1105. According to an embodiment, the processor 300 may store information on the location of the virtual object related to the first electronic device 200 configured based on the location of the first electronic device 200 in the memory 340. For example, the location of the virtual object configured based on the first electronic device 200 is a relative location configured based on the location of the first electronic device 200 and may be changed based on a change in the location of the first electronic device 200.

According to various embodiments, the first electronic device (for example, the processor 120 or 300, the communication module 190 comprising communication circuitry, or the communication circuit 310) may transmit information on at least one virtual object related to the first electronic device (for example, the first electronic device 200) to the second electronic device (for example, the second electronic device 210) in operation 1107. According to an embodiment, the processor 300 may control the communication circuit 310 to transmit information on the virtual object to the second electronic device 210 such that the virtual object related to the first electronic device 200 is shown as being added to at least a part corresponding to the FOV of the user at the location configured based on the first electronic device 200. According to an embodiment, the second electronic device 210 may output virtual object 3 1222 related to the first electronic device 200 to be shown as being added to at least the part 1202 of the real space corresponding to the FOV of the user 1200 wearing the second electronic device 210 based on information on the virtual object received from the first electronic device 200 as illustrated in FIG. 12B. For example, virtual object 3 1222 may include information on execution information (for example, image list display) 1220 of an application program (for example, a gallery application program) executed in the first electronic device 200.

According to various embodiments, when it is determined that the first electronic device 200 is additionally used to execute another separate function, the first electronic device (for example, the processor 120 or 300) may transmit information on the virtual object corresponding to a change in at least one of the application program or the content used in the first electronic device 200 to the second electronic device 210. According to an embodiment, when the application program executed in the first electronic device 200 is changed, the processor 300 may generate a virtual object related to the changed application program. The processor 300 may control the communication circuit 310 to transmit information on the virtual object newly generated based on the changed application program to the second electronic device 210. According to an embodiment, when the content displayed in the display device 320 is changed, the processor 300 may generate the virtual object related to the changed content. The processor 300 may control the communication circuit 310 to transmit information on the virtual object newly generated based on the changed content to the second electronic device 210.

According to an embodiment, the second electronic device 210 may output virtual object 4 1232 related to the first electronic device 200 to be shown as being added to at least the part 1202 of the real space corresponding to the FOV of the user 1200 wearing the second electronic device 210 based on information on the virtual object received from the first electronic device 200 as illustrated in FIG. 12C. For example, virtual object 4 1232 may include information on changed execution information (for example, first image display) 1230 of the application program (for example, gallery application program) executed in the first electronic device 200.

Figure 13:
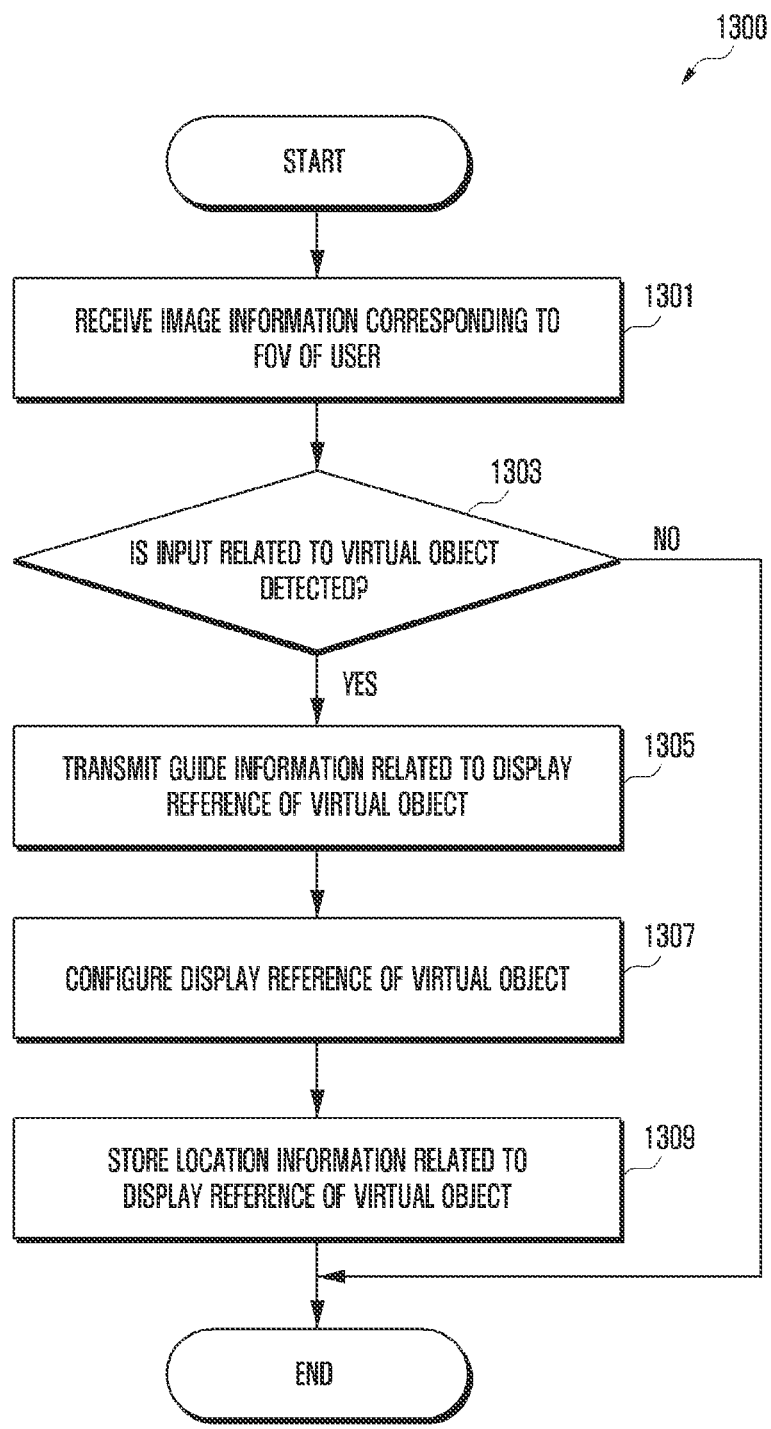
FIG. 13 is a flowchart illustrating a process in which the first electronic device changes a display reference of the virtual object according to various example embodiments.
Figure 14A:
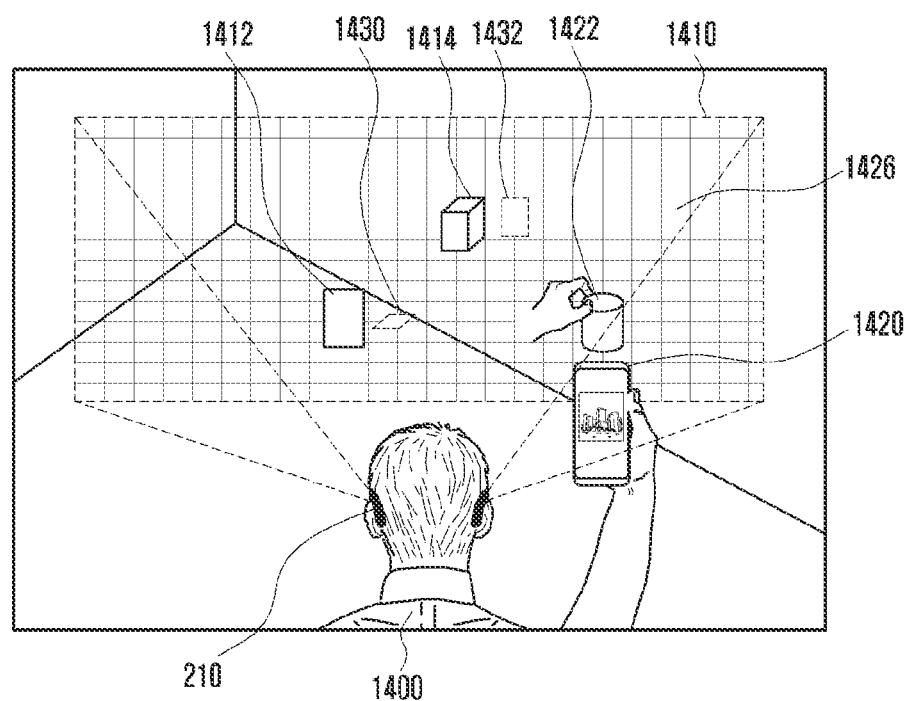
FIGS. 14A, 14B and 14C illustrate screen configurations for displaying guide information related to virtual objects according to various example embodiments.
Figure 14B:
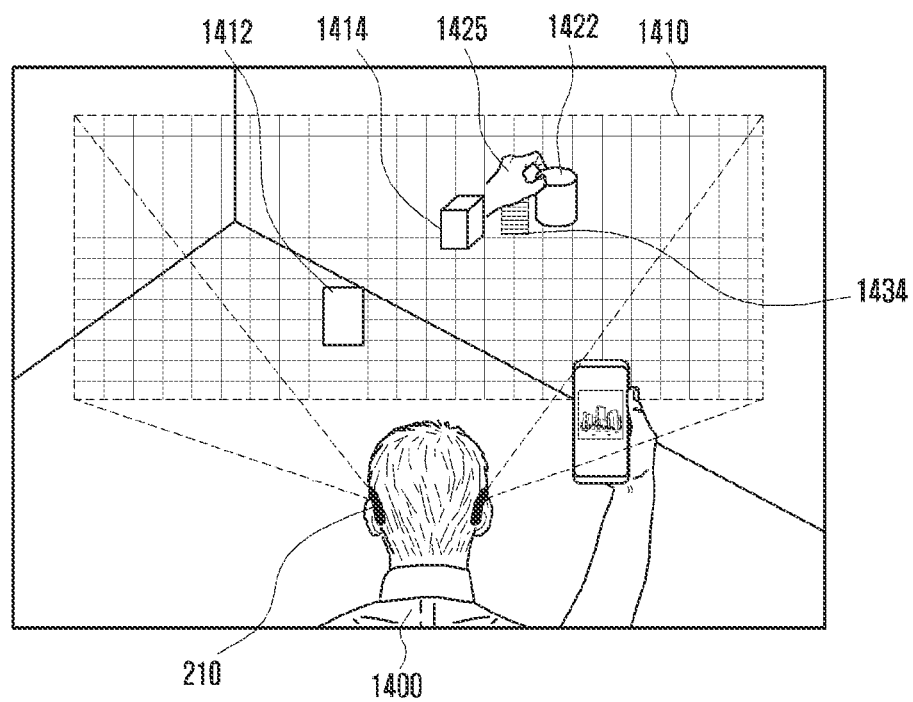
Figure 14C:
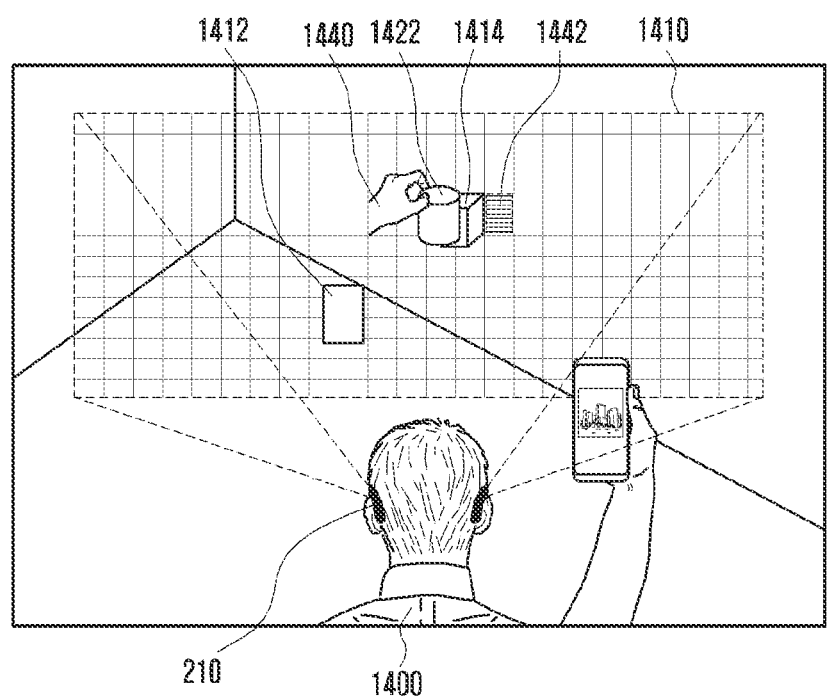
Figure 15A:
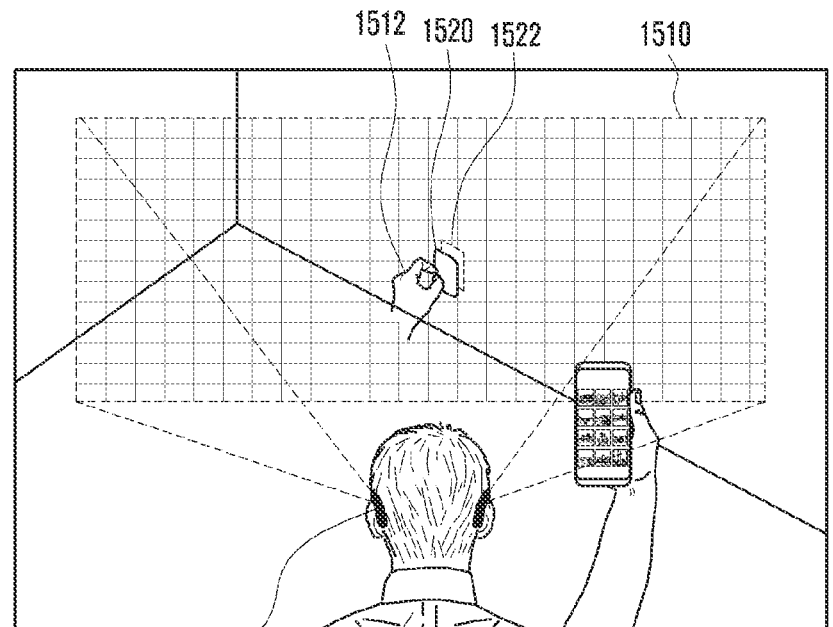
FIGS. 15A, 15B, and 15C illustrate screen configurations for changing the display reference of the virtual object according to various example embodiments.
Figure 15A:
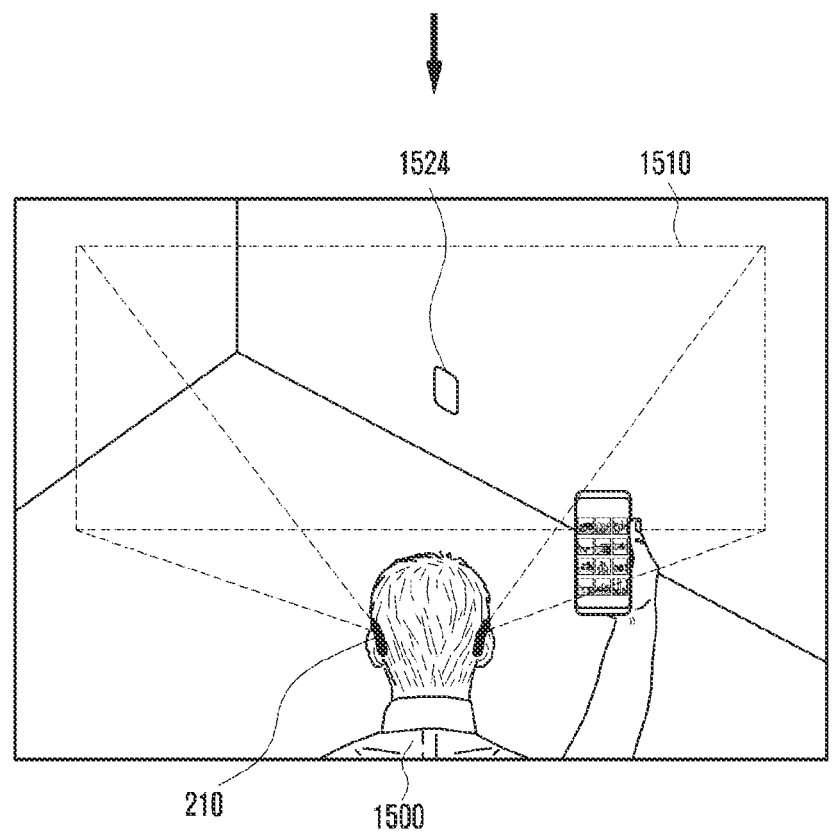
Figure 15B:
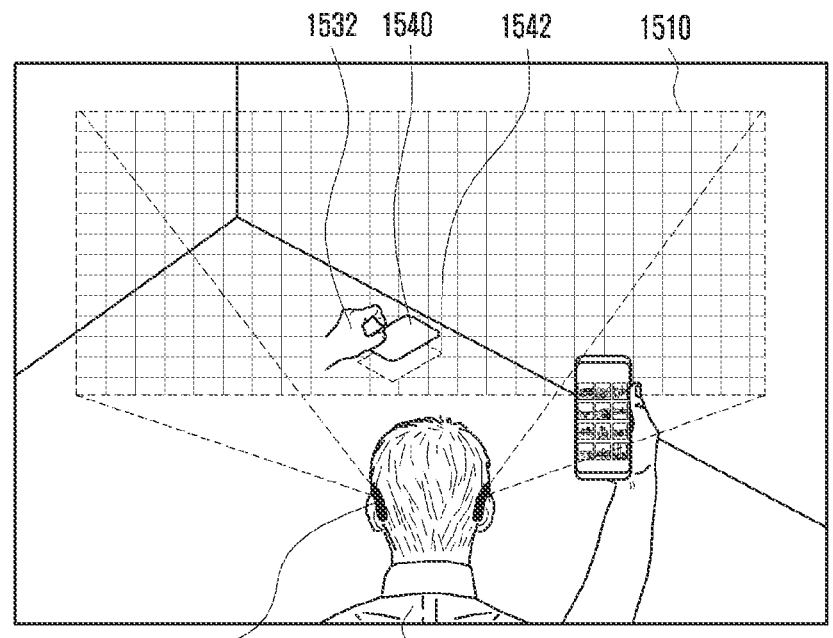
Figure 15B:
Figure 15B:
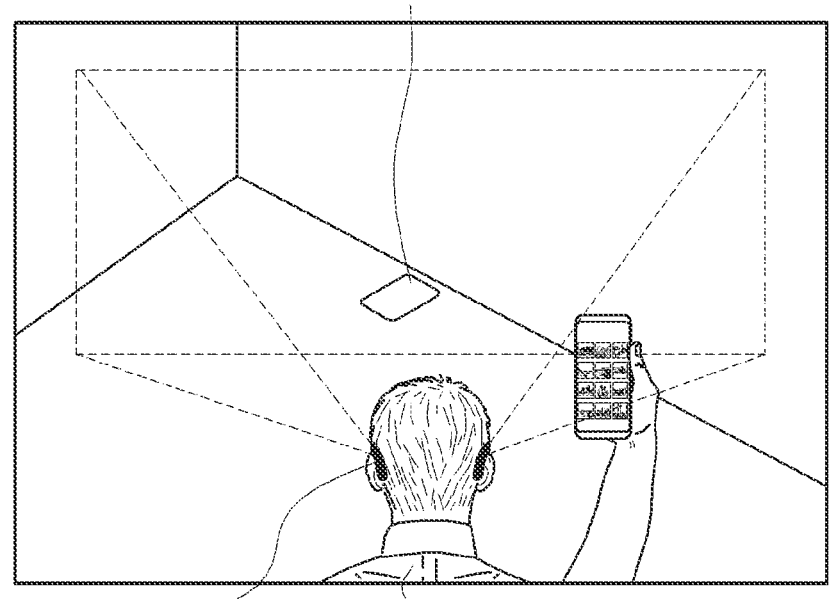
Figure 15C:
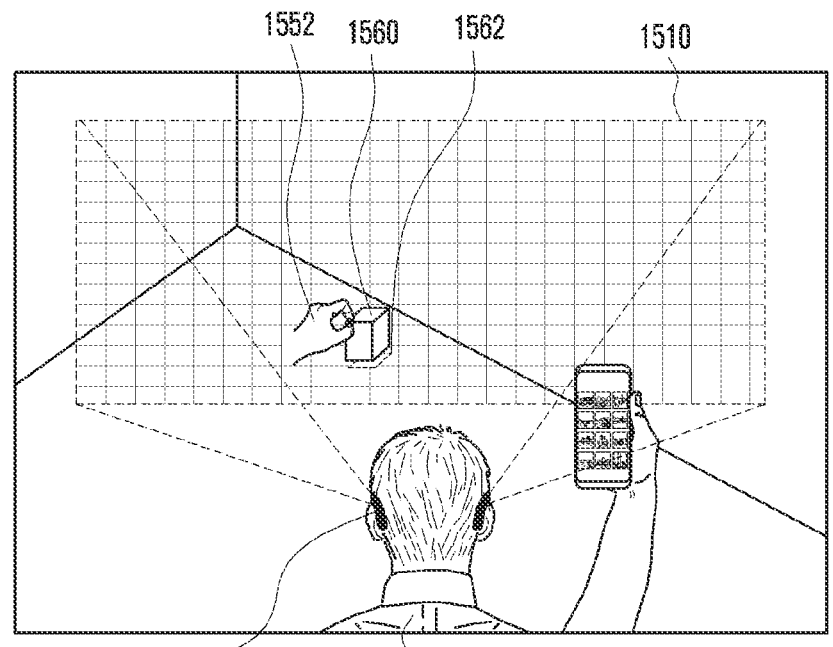
Figure 15C:
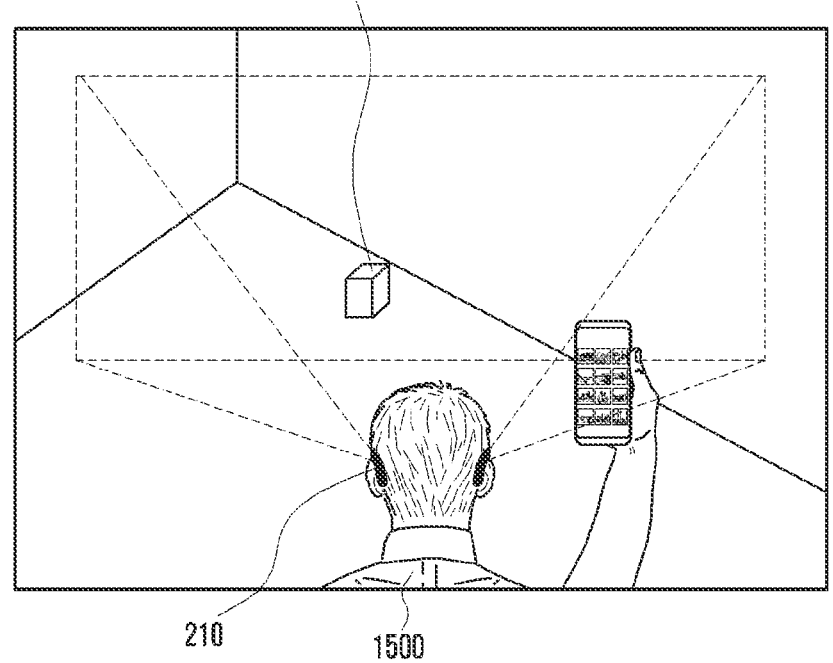
Figure 16:
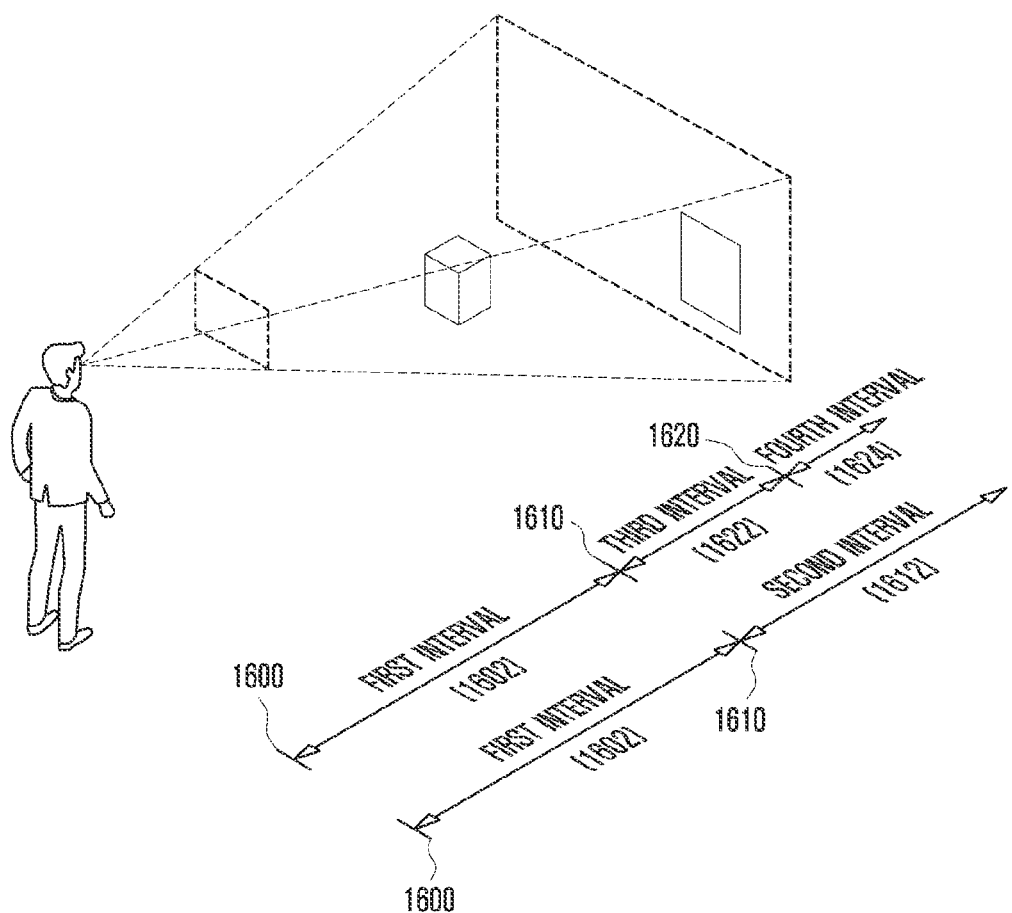
FIG. 16 illustrates an example of configuring the display reference of the virtual object according to various example embodiments.

FIG. 13 is a flowchart 1300 illustrating a process in which the first electronic device changes the reference for displaying the virtual object according to various embodiments. According to an embodiment, operations of FIG. 13 may be an embodiment of operation 507 and operation 509 of FIG. 5. In the following embodiment, operations may be sequentially performed but the sequential performance is not necessary. For example, the order of operations may be changed, and at least two operations may be performed in parallel. For example, the first electronic device of FIG. 13 may be the electronic device 101 of FIG. 1 or the first electronic device 200 of FIG. 2 or FIG. 3. For example, at least some elements of FIG. 13 will be described with reference to FIGS. 14A to 14C, FIGS. 15A to 15C, and FIG. 16. FIGS. 14A, 14B and 14C illustrate screen configurations for displaying guide information related to virtual objects according to various embodiments. FIGS. 15A, 15B, and 15C illustrate screen configurations for changing the display reference of the virtual object according to various embodiments. FIG. 16 illustrates an example of configuring the display reference of the virtual object according to various embodiments.

Referring to FIG. 13, according to various embodiments, when information on a virtual object related to the first electronic device (for example, the first electronic device 200) is transmitted to the second electronic device (for example, the second electronic device 210) (for example, operation 505 of FIG. 5), the first electronic device (for example, the processor 120 or the communication module 190 of FIG. 1 or the processor 300 or the communication circuit 310 of FIG. 3) may receive image information corresponding to the FOV of the user from the second electronic device (for example, the second electronic device 210) in operation 1301. For example, when the augmented reality service is provided, the image information may be periodically or continuously received from the second electronic device 210 through the communication circuit 310.

According to various embodiments, the first electronic device (for example, the processor 120 or 300) may identify whether an input corresponding to the virtual object related to the first electronic device (for example, the first electronic device 200) is detected in operation 1303. According to an embodiment, the processor 300 may analyze the image information received from the second electronic device 210 through the communication circuit 310 to acquire motion information of an external object (for example, a user's hand). The processor 300 may detect a gesture related to the augmented reality service by comparing the motion information of the external object with a gesture list related to the augmented reality service stored in the memory 340. According to an embodiment, the processor 300 may identify whether the gesture related to the augmented reality service is associated with the virtual object related to the first electronic device 200. For example, the processor 300 may compare the location (for example, the display location) of the virtual object related to the first electronic device 200 with the location (for example, the detection location) of the gesture to determine whether the gesture is associated with the virtual object related to the first electronic device 200. According to an embodiment, when the input corresponding to the virtual object related to the first electronic device (for example, the first electronic device 200 of FIG. 2) is not detected (for example, "No" of operation 1303), the first electronic device (for example the processor 120 or 300) may end the operation according to an embodiment.

According to various embodiments, when the input corresponding to the virtual object related to the first electronic device (for example, the first electronic device 200 of FIG. 2) is detected (for example, "Yes" of operation 1303), the first electronic device (for example the processor 120 or 300) may transmit guide information related to the display reference of the virtual object to the second electronic device (for example, the second electronic device 210) in operation 1305. For example, the guide information may include location information which can be configured as the reference for displaying the virtual object related to the first electronic device 200/1420. According to an embodiment, the second electronic device 210 may output virtual object 4 1422 related to the first electronic device 200 to be shown as being added to an area 1410 corresponding to the FOV of a user 1400 wearing the second electronic device 210 as illustrated in FIG. 14A. The second electronic device 210 may switch to a grid mode based on the guide information received from the first electronic device 200. For example, the second electronic device 210 may output at least one of virtual object 1 1412 or virtual object 2 1414 hidden by the area 1410 corresponding to the FOV of the user 1400 wearing the second electronic device 210 based on switching to the grid mode. For example, the second electronic device 210 may display guide information 1426 of the grid in the area 1410 corresponding to the FOV of the user 1400 wearing the second electronic device 210 based on switching to the grid mode. For example, the guide information 1426 may include a first guide area 1430 indicating that virtual object 4 1422 can be displayed based on virtual object 1 1412 and a second guide area 1432 indicating that virtual object 4 1422 can be displayed based on at least one of virtual object 2 1414.

According to various embodiments, the first electronic device (for example, the processor 120 or 300) may configure the display reference of the virtual object based on the location of the virtual object changed according to the input corresponding to the virtual object related to the first electronic device (for example, the first electronic device 200) in operation 1307. According to an embodiment, when it is determined that virtual object 4 1422 moves to a configurable second guide area 1432 of the display reference based on a gesture 1425 (for example, a movement gesture) according to image information received from the second electronic device 210 as illustrated in FIG. 14B, the processor 300 may control the communication circuit 310 to transmit guide information 1434 related to a function of configuring the display reference to the second electronic device 210. For example, movement to the second guide area 1432 may include a state in which the location of virtual object 4 1422 moves within a reference range configured based on a second guide area 1432. According to an embodiment, when virtual object 4 1422 escapes the configurable second guide area 1432 of the display reference (for example, overlaps virtual object 2 1414) based on a gesture 1440 (for example, a movement gesture) according to image information received from the second electronic device 210 as illustrated in FIG. 14C, the processor 300 may control the communication circuit 310 to transmit guide information 1442 related to an error in the configuration of the display reference to the second electronic device 210.

According to an embodiment, the processor 300 may configure the reference for displaying the virtual object related to the first electronic device 200 based on the changed location (for example, the distance from the reference point) of the virtual object related to the first electronic device 200 based on the gesture related to the augmented reality service. For example, referring to FIG. 16, when the changed location of the virtual object related to the first electronic device 200 is included in a first interval 1602 based on a reference point (for example, the user location) 1600, the processor 300 may configure the reference for displaying the virtual object in a first scheme (for example, a user reference). For example, the location of the virtual object configured as the first scheme may include a relative location configured based on the location of the user wearing the second electronic device 210. For example, the first interval 1602 may include an area from the reference point 1600 to a first point 1610. For example, when the changed location of the virtual object related to the first electronic device 200 is included in a second interval 1612 based on the reference point (for example, user location) 1600, the processor 300 may configure the reference for displaying the virtual object in a third scheme (for example, background reference). For example, the location of the virtual object configured as the third scheme may be fixed to a coordinate value (for example, longitude, latitude, and/or height) of the real space corresponding to the FOV of the user wearing the second electronic device 210. For example, the second interval 1612 may include the remaining areas except for the first interval 1602 based on the reference point 1600. For example, when the changed location of the virtual object related to the first electronic device 200 is included in a third interval 1622 based on the reference point (for example, user location) 1600, the processor 300 may configure the reference for displaying the virtual object in a second scheme (for example, external object reference). For example, the location of the virtual object configured as the second scheme may include a relative location configured based on the location of the external object existing in the real space corresponding to the FOV of the user wearing the second electronic device 210. For example, the third interval 1622 may include an area from the first point 1610 to the second point 1620. For example, the second point 1620 may be configured to be farther from the reference point 1600 than the first point 1610. For example, when the changed location of the virtual object related to the first electronic device 200 is included in a fourth interval 1624 based on the reference point (for example, user location) 1600, the processor 300 may configure the reference for displaying the virtual object in a third scheme (for example, background reference). For example, the fourth interval 1624 may include the remaining areas except for the third interval 1622 from the second interval 1612. For example, the location (for example, display location) of the virtual object related to the first electronic device 200 may include location information of the virtual object at a time point at which the input of the virtual object related to the first electronic device 200 ends.

According to various embodiments, the first electronic device (for example, the processor 120 or 300) may store location information of the virtual object related to the first electronic device (for example, the first electronic device 200) configured based on the display reference of the virtual object in operation 1309. According to an embodiment, the processor 300 may store information related to the location of the virtual object related to the first electronic device 200 configured based on the changed display reference of the virtual object in the memory 340. For example, when the location of the virtual object is configured in the first scheme, the location may be changed based on a change in the location of the user 1400 wearing the second electronic device 210. For example, when the location of the virtual object is configured in the second scheme, the location may be changed based on a change in the location of the external object configured based on the display reference. For example, when the location of the virtual object is configured in the third scheme, the location may be fixed to a coordinate value (for example, longitude, latitude, and/or height) of the real space.

According to various embodiments, the first electronic device (for example, the processor 120 or 300) may provide guide information related to the display reference of the virtual object based on the form (for example, plane or solid) of the virtual object.

According to an embodiment, at least one of virtual object 5 1520 or virtual object 6 1540 related to the first electronic device 200 may be configured as a plane (for example, two dimension) as illustrated in FIG. 15A or 15B. For example, when movement within a reference distance (for example, 15 cm) in which virtual object 5 1520 can be disposed on the surface of a wall based on the gesture 1512 as illustrated in FIG. 15A, the processor 300 may control the communication circuit 310 to transmit information related to the guide area 1522 which can be configured as the display reference to the second electronic device 210. When the gesture 1512 of holding virtual object 5 1520 is released based on image information provided from the second electronic device 210, the processor 300 may control the communication circuit 310 to transmit information related to virtual object 5 1520 to the second electronic device 210 such that virtual object 5 1520 is shown as being added to the location corresponding to the guide area 1522. For example, the second electronic device 210 may output virtual object 5 1520 in the form 1524 in which virtual object 5 stands on the wall within the area 1510 corresponding to the FOV of the user 1500 based on information related to virtual object 5 1520 received from the first electronic device 200.

For example, when movement within the reference distance (for example, 15 cm) in which virtual object 6 1540 can be disposed on the bottom is detected based on the gesture 1532 as illustrated in FIG. 15B, the processor 300 may control the communication circuit 310 to transmit information related to the guide area 1542 which can be configured as the display reference to the second electronic device 210. When the gesture 1532 of holding virtual object 6 1540 is released based on image information provided from the second electronic device 210, the processor 300 may control the communication circuit 310 to transmit information related to virtual object 6 1540 to the second electronic device 210 such that virtual object 6 is shown as being added to the location corresponding to the guide area 1542. For example, the second electronic device 210 may output virtual object 6 1540 in the form 1544 in which virtual object 6 lies at the bottom within the area 1510 corresponding the FOV of the user 1500 based on information related to virtual object 6 received from the first electronic device 200.

According to an embodiment, virtual object 7 1560 related to the first electronic device 200 may be configured in the solid form (for example, three-dimensionally) as illustrated in FIG. 15C. For example, when movement within the reference distance (for example, 15 cm) in which virtual object 7 1560 can be disposed at the bottom is detected based on the gesture 1552 as illustrated in FIG. 15C, the processor 300 may control the communication circuit 310 to transmit information related to the guide area 1562 which can be configured as the display reference to the second electronic device 210. For example, when virtual object 7 1560 moves within the reference distance (for example, 15 cm) in which virtual object 7 can be disposed at the bottom, virtual object 7 may be displayed in a plane (for example, two dimensional) form. In this case, plane virtual object 7 1560 may include a thumbnail of virtual object 7 1560 in a three-dimensional form. For example, when the gesture 1552 of holding virtual object 7 1560 is released based on image information provided form the second electronic device 210, the processor 300 may control the communication circuit 310 to transmit information related to virtual object 7 1560 to the second electronic device 210 such that three-dimensional virtual object 7 1560 is shown as being added to the location (for example, some areas of the bottom) corresponding to the guide area 1562. For example, the second electronic device 210 may output virtual object 7 1560 in the form 1564 in which virtual object 7 stands on the bottom within the area 1510 corresponding to the FOV of the user 1500 based on information related to virtual object 7 1560 received from the first electronic device 200.

Figure 17:
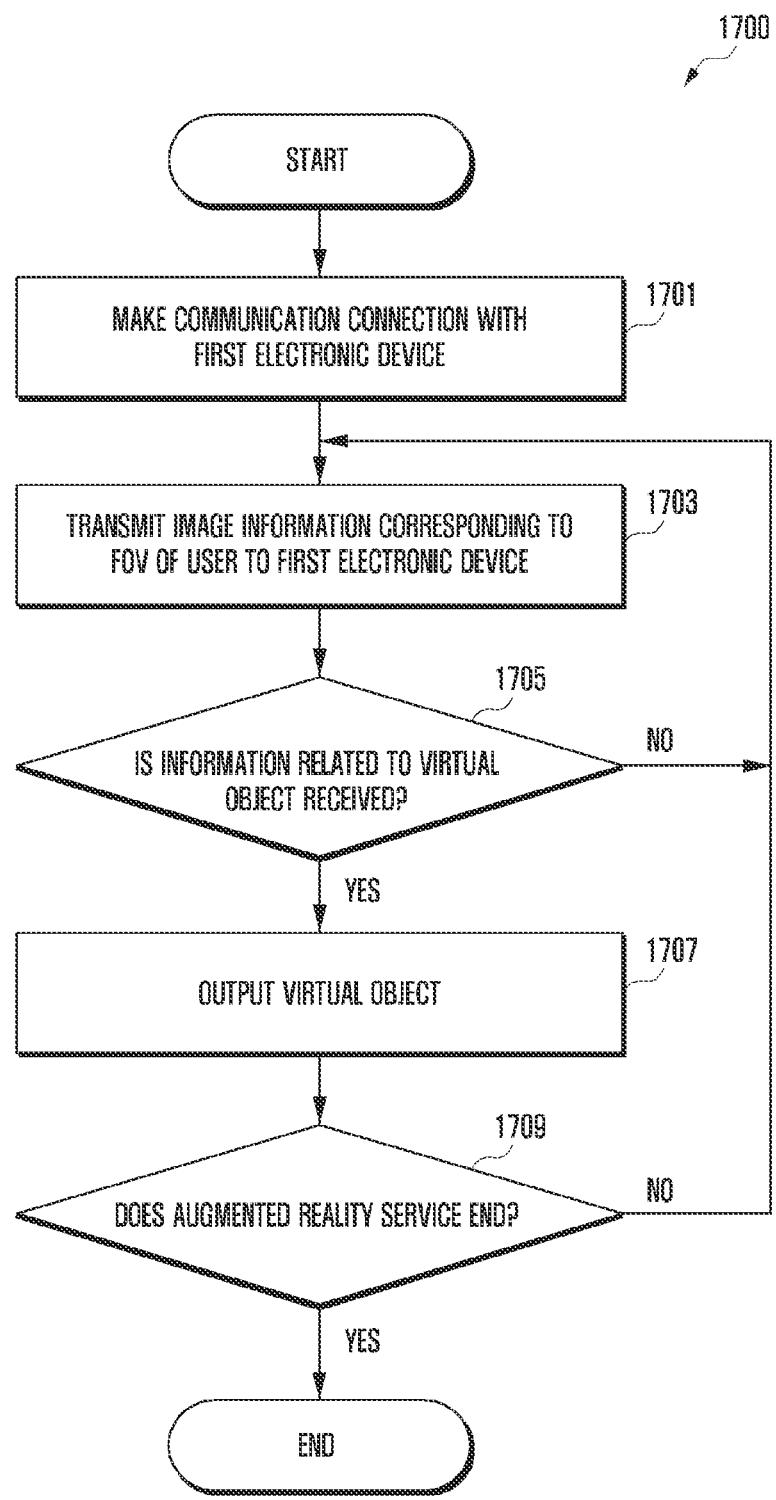
FIG. 17 is a flowchart illustrating a process in which the second electronic device outputs the virtual object according to various example embodiments.

FIG. 17 is a flowchart 1700 illustrating a process in which the second electronic device outputs a virtual object according to various embodiments. In the following embodiment, operations may be sequentially performed but the sequential performance is not necessary. For example, the order of operations may be changed, and at least two operations may be performed in parallel. For example, the second electronic device of FIG. 17 may be the electronic device 101 of FIG. 1 or the second electronic device 210 of FIG. 2 or FIG. 4.

Referring to FIG. 17, according to various embodiments, the second electronic device (for example, the processor 120 or the communication module 190 of FIG. 1 or the processor 400 or the communication circuit 410 of FIG. 4) may establish a wired or wireless communication connection with the first electronic device (for example, the first electronic device 200 of FIG. 2) in operation 1701. According to an embodiment, the processor 400 may control the communication circuit 410 to establish a communication link (or a communication channel) between the first electronic device 200 and the second electronic device 210.

According to various embodiments, the second electronic device (for example, the processor 120 or 400, the communication module 190, or the communication circuit 410) may transmit image information corresponding to the FOV of the user wearing the second electronic device (for example, the second electronic device 210) to the first electronic device (for example, the first electronic device 200) in operation 1703. According to an embodiment, the processor 400 may control the communication circuit 410 to transmit at least one piece of image information or surrounding spatial information acquired through the camera module 420 to the first electronic device 200. For example, at least one piece of the image information or the surrounding spatial information acquired through the camera module 420 may be periodically or continuously transmitted to the first electronic device 200.

According to various embodiments, the second electronic device (for example, the processor 120 or 400, the communication module 190, or the communication circuit 410) may identify whether information related to the virtual object is received from the first electronic device (for example, the first electronic device 200) in operation 1705. For example, the information related to the virtual object may include at least one of a form (or shape), a color, a size, or a location of the virtual object.

According to various embodiments, when information related to the virtual object is received from the first electronic device (for example, the first electronic device 200) (for example, "Yes" of operation 1705), the second electronic device (for example, the processor 120 or 400) may output at least one virtual object to be shown as being added to at least a part of the real space corresponding to the FOV of the user based on the information related to the virtual object received from the first electronic device (for example, the first electronic device 200) in operation 1707. According to an embodiment, the processor 400 may identify at least one of graphic characteristics (for example, form, size, or color) of the virtual object based on the information related to the virtual object provided from the first electronic device 200. The processor 400 may control the display device 430 to output the virtual object corresponding to the graphic characteristic such that the virtual object is overlappingly shown at the location of the virtual object in the real space corresponding to the FOV of the user wearing the second electronic device 210.

According to various embodiments, the second electronic device (for example, the processor 120 or 400) may identify whether the augmented reality service ends in operation 1709. According to an embodiment, when the communication connection with the first electronic device 200 is released, the processor 400 may determine that the augmented reality service ends. According to an embodiment, when information related to the end of the augmented reality service is received from the first electronic device 200 through the communication circuit 410, the processor 400 may determine that the augmented reality service ends.

According to various embodiments, when it is determined that the augmented reality service ends (for example, "Yes" of operation 1709), the second electronic device (for example, the processor 120 or 400) may end the operation according to an embodiment.

According to various embodiments, when the information related to the virtual object is not received from the first electronic device (for example, the first electronic device 200) (for example, "No" of operation 1705) or when the augmented reality service is maintained (for example, "No" of operation 1709), the second electronic device (for example, the processor 120 or 400) may transmit image information corresponding to the FOV of the user wearing the second electronic device (for example, the second electronic device 210) to the first electronic device (for example, the first electronic device 200) in operation 1703.

In various embodiments, the second electronic device 210 may independently provide the augmented reality service. According to an embodiment, the second electronic device 210 may provide the augmented reality service separately from the first electronic device 200.

Figure 18:
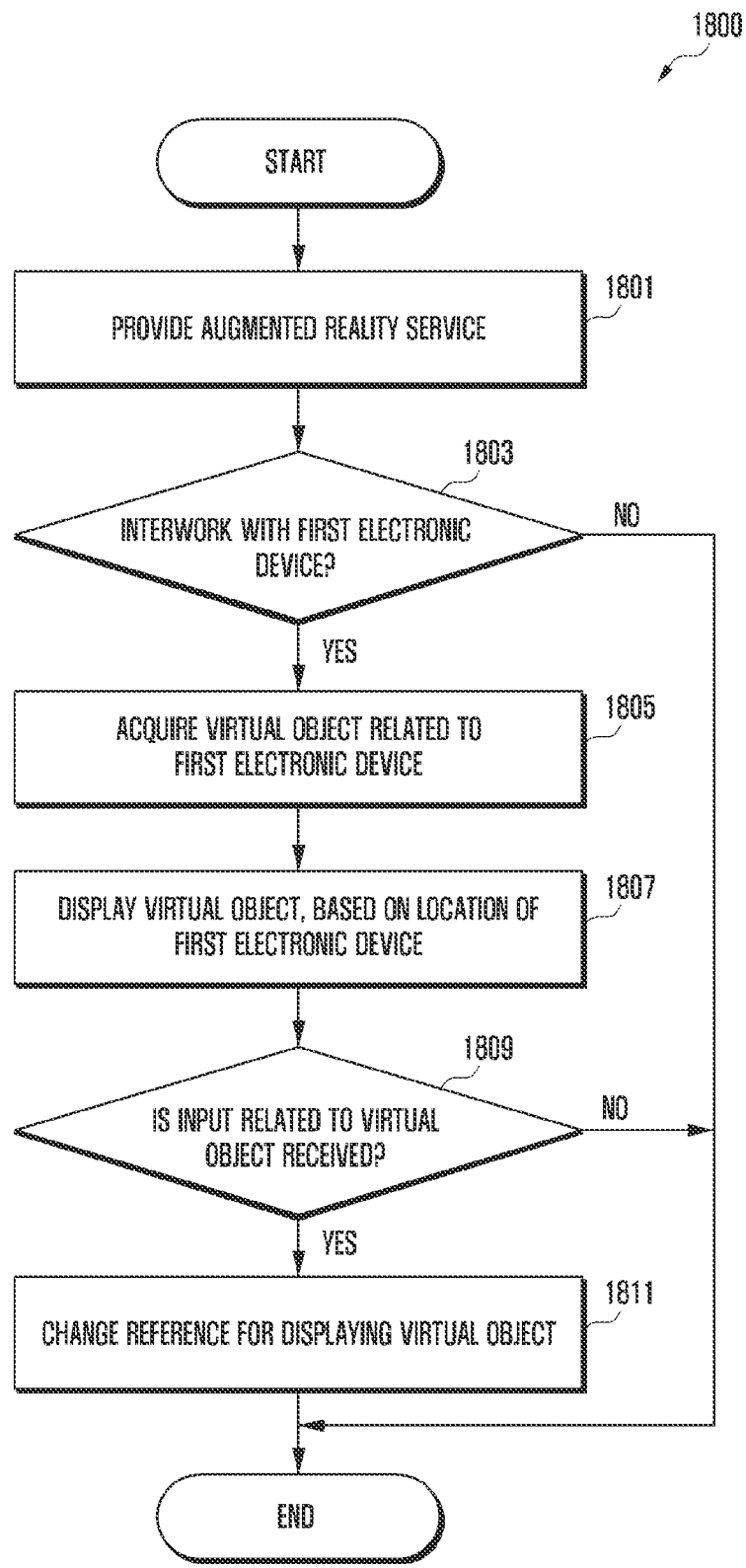
FIG. 18 is a flowchart illustrating a process in which the second electronic device configures the reference for displaying the virtual object according to various example embodiments.

FIG. 18 is a flowchart 1800 illustrating a process in which the second electronic device configures a reference for displaying the virtual object according to various embodiments. In the following embodiment, operations may be sequentially performed but the sequential performance is not necessary. For example, the order of operations may be changed, and at least two operations may be performed in parallel. For example, the second electronic device of FIG. 18 may be the electronic device 101 of FIG. 1 or the second electronic device 210 of FIG. 2 or FIG. 4.

Referring to FIG. 18, according to various embodiments, the second electronic device (for example, the processor 120 of FIG. 1 or the processor 400 of FIG. 4) may provide the augmented reality service in operation 1801. According to an embodiment, the processor 400 may acquire at least one virtual object related to the augmented reality service based on image information related to the real space acquired through the camera module 420 comprising a camera. The processor 400 may control the display device 430 such that at least one virtual object is shown as being added to the real space corresponding to the FOV of the user wearing the second electronic device 210. For example, the virtual object may include at least one of information related to the external object located in the real space corresponding to the FOV of the user wearing the second electronic device 210 or information related to the application program executed in the second electronic device 210.

According to various embodiments, the second electronic device (for example, the processor 120 or 400) may identify whether the second electronic device interworks with the first electronic device (for example, the first electronic device 200 of FIG. 2) while the augmented reality service is provided in operation 1803. According to an embodiment, the processor 400, comprising processing circuitry, may determine whether the communication connection with the first electronic device 200 is made, whether an external object related to the first electronic device 200 exists in an area corresponding to the FOV of the user wearing the second electronic device 210, or whether the second electronic device interworks with the first electronic device 200 based on at least one piece of location information of the first electronic device 200 and the second electronic device 210.

According to an embodiment, when it is determined that the second electronic device (for example, the processor 120 or 400, comprising processing circuitry) does not interwork with the first electronic device (for example, the first electronic device 200 of FIG. 2) (for example, "No" of operation 1803), the second electronic device may end the embodiment. For example, the second electronic device (for example, the processor 120 or 400) may continuously provide the augmented reality service.

According to various embodiments, when it is determined that the second electronic device (for example, the processor 120 or 400) interworks with the first electronic device (for example, the first electronic device 200 of FIG. 1) while the augmented reality service is provided (for example, "Yes" of operation 1803), the second electronic device may acquire the virtual object related to the first electronic device (for example, the first electronic device 200) in operation 1805. According to an embodiment, when it is determined that the second electronic device interworks with the first electronic device 200 while the augmented reality service is provided, the processor 400 may control the communication circuit 410 to transmit a request signal related to state information to the first electronic device 200. When state information of the first electronic device 200 is received through the communication circuit 410 in response to the request signal, the processor 400 may generate the virtual object related to the first electronic device 200 based on the state information of the first electronic device 200. For example, the virtual object related to the first electronic device 200 may be generated based on information related to an application program executed in the first electronic device 200. According to an embodiment, when it is determined that the second electronic device interworks with the first electronic device 200, the processor 400 may control the display device 430 to hide the virtual object related to the augmented reality service.

According to various embodiments, the second electronic device (for example, the processor 120 or 400) may display the virtual object related to the first electronic device based on the location of the first electronic device (for example, the first electronic device 200) in operation 1807. According to an embodiment, the processor 400 may configure the display location of the virtual object related to the first electronic device 200 based on the first electronic device 200 (for example, the location of the first electronic device 200). The processor 400 may control the display device 430 such that the virtual object related to the first electronic device 200 overlaps at least a part corresponding to the location of the virtual object in the real space corresponding to the FOV of the user wearing the second electronic device 210. For example, the location of the virtual object configured based on the first electronic device 200 is a relative location configured based on the location of the first electronic device 200 and may be changed based on a change in the location of the first electronic device 200.

According to various embodiments, the second electronic device (for example, the processor 120 or 400) may identify whether an input corresponding to the virtual object related to the first electronic device (for example, the first electronic device 200) is received in operation 1809. According to an embodiment, the processor 400 may determine a gesture based on image information related to the real space corresponding to the FOV of the user wearing the second electronic device 210 acquired through the camera module 420. The processor 400 may identify whether the gesture detected based on the image information acquired through the camera module 420 is associated with the virtual object related to the first electronic device 200. For example, the processor 400 may compare the location (for example, display location) of the virtual object related to the first electronic device 200 with the location at which the gesture is detected to determine whether the gesture is associated with the virtual object related to the first electronic device 200. According to an embodiment, when the input corresponding to the virtual object related to the first electronic device (for example, the first electronic device 200 of FIG. 2) is not received (for example, "No" of operation 1809), the second electronic device (for example, the processor 120 or 400) may end the operation according to an embodiment.

According to various embodiments, when the input corresponding to the virtual object related to the first electronic device (for example, the first electronic device 200 of FIG. 1) is received (for example, "Yes" of operation 1809), the second electronic device (for example, the processor 120 or 400) may change the reference for displaying the virtual object related to the first electronic device (for example, the first electronic device 200) based on the input corresponding to the virtual object in operation 1811. According to an embodiment, when the location (for example, display location) of the virtual object related to the first electronic device 200 is changed based on a user input (for example, gesture) as illustrated in operations 1301 to 1309 of FIG. 13, the processor 400 may configure the reference for displaying the virtual object related to the first electronic device 200 based on the changed location (or movement distance) of the virtual object related to the first electronic device 200. For example, the reference for displaying the virtual object may be changed based on at least one of the user, the second electronic device 210, an external object, a background, the first electronic device 200, or another electronic device.

Figure 19:
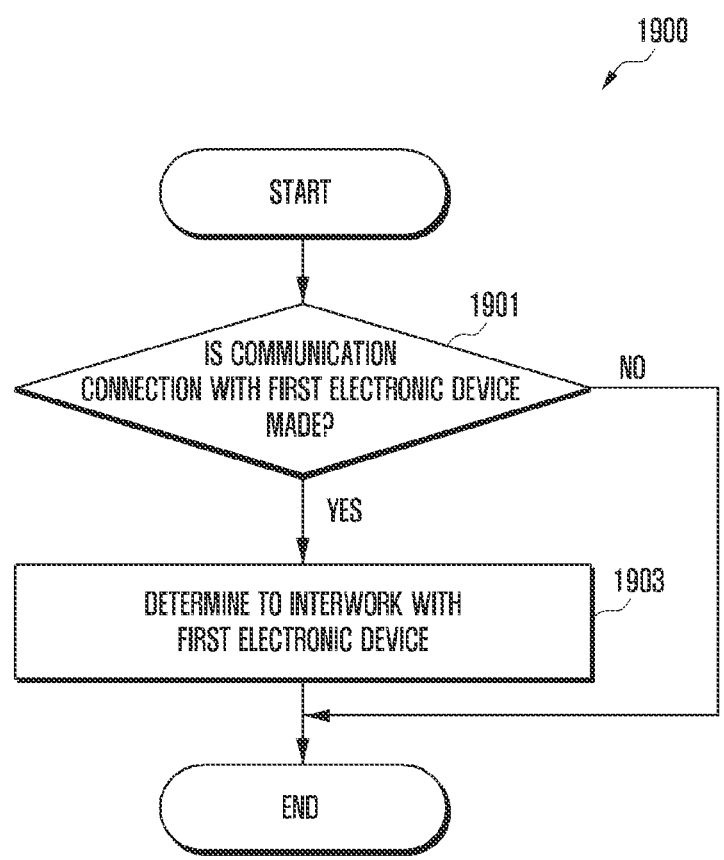
FIG. 19 is a flowchart illustrating a process in which the second electronic device determines whether to interwork with the first electronic device based on a communication connection with the first electronic device according to various example embodiments.

FIG. 19 is a flowchart 1900 illustrating a process in which the second electronic device determines whether to interwork with the first electronic device based on the communication connection with the first electronic device. According to an embodiment, operations of FIG. 19 may be an embodiment of operation 1803 of FIG. 18. In the following embodiment, operations may be sequentially performed but the sequential performance is not necessary. For example, the order of operations may be changed, and at least two operations may be performed in parallel. For example, the second electronic device of FIG. 19 may be the electronic device 101 of FIG. 1 or the second electronic device 210 of FIG. 2 or FIG. 4.

Referring to FIG. 19, according to various embodiments, when the augmented reality service is provided (for example, operation 1801 of FIG. 18), the second electronic device (for example, the processor 120 or the communication module 190 of FIG. 1 or the processor 400 or the communication circuit 410 of FIG. 4) may identify whether a wired or wireless communication connection with the first electronic device (for example, the first electronic device 200 of FIG. 2) is made in operation 1901. According to an embodiment, the processor 400 may identify whether a communication link (or a communication channel) between the first electronic device 200 and the second electronic device 210 is established through the communication circuit 410.

According to various embodiments, when the communication connection with the first electronic device (for example, the first electronic device 200 of FIG. 2) is made (for example, "Yes" of operation 1901), the second electronic device (for example, the processor 120 or 400) may determine that the second electronic device interworks with the first electronic device (for example, the first electronic device 200) while the augmented reality service is provided in operation 1903.

According to various embodiments, when the communication connection with the first electronic device (for example, the first electronic device 200 of FIG. 2) is made (for example, "No" of operation 1901), the second electronic device (for example, the processor 120 or 400) may determine that the second electronic device does not interwork with the first electronic device (for example, the first electronic device 200) although not illustrated.

FIG. 20 is a flowchart 2000 illustrating a process in which the second electronic device determines whether to interwork with the first electronic device based on image information according to various embodiments. According to an embodiment, operations of FIG. 20 may be an embodiment of operation 1803 of FIG. 18. In the following embodiment, operations may be sequentially performed but the sequential performance is not necessary. For example, the order of operations may be changed, and at least two operations may be performed in parallel. For example, the second electronic device of FIG. 20 may be the electronic device 101 of FIG. 1 or the second electronic device 210 of FIG. 2 or FIG. 4.

Referring to FIG. 20, according to various embodiments, when the augmented reality service is provided (for example, operation 1801 of FIG. 18), the second electronic device (For example, the processor 120 or the communication module 190 of FIG. 1, or the processor 400 or the communication circuit 410 of FIG. 4) may establish a communication link with the first electronic device (for example, the first electronic device 200 of FIG. 2) in operation 2001. According to an embodiment, the processor 400 may control the communication circuit 410 to establish a wireless communication link or a wired communication link between the first electronic device 200 and the second electronic device 210.

According to various embodiments, the second electronic device (for example, the processor 120 or 400) may acquire image information corresponding to the FOV of the user wearing the second electronic device (for example, the second electronic device 210) in operation 2003. According to an embodiment, the processor 400 may periodically or continuously acquire image information related to the real space corresponding to the FOV of the user wearing the second electronic device 210 through the camera module 420.

According to various embodiments, the second electronic device (for example, the processor 120 or 400) may identify whether the first electronic device (for example, the first electronic device 200) is located in the real space corresponding to the FOV of the user based on the image information corresponding to the FOV of the user in operation 2005. According to an embodiment, the processor 400 may detect at least one external object located in the real space corresponding to the FOV of the user wearing the second electronic device 210 based on the image information acquired through the camera module 420. The processor 400 may identify whether there is an external object related to the first electronic device 200 among at least one external object located in at least a part of the real space corresponding to the FOV of the user. For example, the external object related to the first electronic device 200 may include at least one of an external object corresponding to all or some of the exterior configurations of the first electronic device 200 or an external object related to content displayed in the display device 320 of the first electronic device 200.

According to an embodiment, when the first electronic device (for example, the first electronic device 200) is not located in the real space corresponding to the FOV of the user (for example, "No" of operation 2005), the second electronic device (for example, the processor 120 or 400) may end the operation according to an embodiment. For example, when the external object related to the first electronic device 200 does not exist in the real space corresponding to the FOV of the user wearing the second electronic device 210, the processor 400 may determine that the second electronic device does not interwork with the first electronic device 200 while the augmented reality service is provided.

According to various embodiments, when the first electronic device (for example, the first electronic device 200) is located in the real space corresponding to the FOV of the user (for example, "Yes" of operation 2005), the second electronic device (for example, the processor 120 or 400) may determine to interwork with the first electronic device (for example, the first electronic device 200) while the augmented reality service is provided in operation 2007. According to an embodiment, when the external object 730 related to the first electronic device 200 exists in at least the part 712 of the real space corresponding to the FOV of the user 700 wearing the second electronic device 210 as illustrated in FIG. 7A, the processor 400 may determine to interwork with the first electronic device 200 while the augmented reality service is provided.

According to various embodiments, a method of operating a first electronic device (for example, the electronic device 101 of FIG. 1 or the first electronic device 200 of FIG. 2) may include an operation of establishing a communication connection with a second electronic device, an operation of, when it is determined that a user wearing the second electronic device uses the first electronic device, an operation of transmitting information related to a first virtual object displayed based on a location of the first electronic device to the second electronic device via the established communication connection, and an operation of changing a reference for displaying the first virtual object based on an input related to the first virtual object.

According to various embodiments, the method may further include an operation of detecting an external object located in a real space corresponding to the FOV of the user wearing the second electronic device based on image information received from the second electronic device, an operation of acquiring a second virtual object corresponding to the external object, and an operation of transmitting information on the second virtual object to the second electronic device.

According to various embodiments, the method may further include an operation of performing user authentication based on the communication connection with the second electronic device, and the operation of transmitting the information related to the second virtual object may include an operation of transmitting information related to the second virtual object to the second electronic device based on success in the user authentication.

According to various embodiments, the method may further include an operation of, when it is determined that the user wearing the second electronic device uses the first electronic device, transmitting information related to hiding of the second virtual object to the second electronic device.

According to various embodiments, the first virtual object may include at least one virtual object related to an application program executed in the first electronic device.

According to various embodiments, the method may further include an operation of determining whether the user uses the first electronic device based on at least one of whether the display device operatively connected to the electronic device is activated, execution information of an application program, whether information related to the first electronic device is included in an area corresponding to an FOV of the user wearing the second electronic device, or location information of the first electronic device and the second electronic device.

According to various embodiments, the information related to the first virtual object includes at least one of information related to coordinates for displaying the first virtual object in a coordinate system based on the location of the first electronic device.

According to various embodiments, the information related to the first virtual object includes at least one of a relative direction or a relative separation distance for displaying the first virtual object based on the location of the first electronic device. "Based on" as used herein covered based at least on.

According to various embodiments, the operation of changing the reference may include an operation of identifying the input related to the first virtual object based on image information received from the second electronic device and an operation of changing the reference for displaying the first virtual object based on the input related to the first virtual object.

According to various embodiments, the operation of changing the reference may include an operation of, when the location of the first virtual object is changed within an area corresponding to an FOV of the user wearing the second electronic device based on the input related to the first virtual object, change the reference for displaying the first virtual object based on the changed location of the first virtual object.

According to various embodiments, the reference for displaying the first virtual object may include at least one of the first electronic device, coordinates of a real space, an external object located within an area corresponding to an FOV of the user wearing the second electronic device, the user, or a third electronic device.

According to various embodiments, the information related to the first virtual object may include at least one of a form, a size, a color, or a location of the first virtual object.

Example embodiments used in the specification and drawings are only specific examples to easily describe the technical content according to example embodiments and help understanding of embodiment of the disclosure but do not limit the scope of the example embodiments. Therefore, not only the embodiments disclosed herein but also all changes or changed forms derived based on the technical idea of various example embodiments should be interpreted as being included in the scope of the various example embodiments. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A first electronic device comprising:
   communication circuitry;

at least one processor comprising processing circuitry and operatively connected to the communication circuitry; and memory storing instructions, wherein the instructions which, when executed by the at least one processor individually and/or collectively, cause the first electronic device to:

establish a communication connection with a second electronic device via the communication circuitry;

transmit information related to a first virtual object for display on the second electronic device based on a location of the first electronic device to the second electronic device via the established communication connection, based on a determination that a user wearing the second electronic device uses the first electronic device regardless of whether the first electronic device is located in a real space corresponding to a field of view (FOV) of the user; and change a reference for displaying the first virtual object, based on an input related to the first virtual object.

2. The first electronic device of claim 1, wherein the memory storing instructions which, when executed by the at least one processor individually and/or collectively, cause the first electronic device to:

detect an external object located in the real space corresponding to the FOV of the user of the second electronic device, based on image information received from the second electronic device through the communication circuitry;

acquire a second virtual object corresponding to the external object; and transmit information regarding the second virtual object to the second electronic device via the established communication connection.

3. The first electronic device of claim 2, wherein the memory storing instructions which, when executed by the at least one processor individually and/or collectively, cause the first electronic device to, based on a determination that the user of the second electronic device uses the first electronic device, transmit information related to hiding of the second virtual object to the second electronic device via the established communication connection.

4. The first electronic device of claim 1, wherein the first virtual object comprises at least one virtual object related to an application program executed in the first electronic device.

5. The first electronic device of claim 1, further comprising a display, wherein the memory storing instructions which, when executed by the at least one processor individually and/or collectively, cause the first electronic device to determine whether the user uses the first electronic device, based on at least one of: whether the display is activated, execution information of an application program, whether information related to the first electronic device is included in an area corresponding to the FOV of the user of the second electronic device, or location information of the first electronic device and the second electronic device.

6. The first electronic device of claim 1, wherein the information related to the first virtual object comprises at least one of: information related to coordinates for displaying the first virtual object in a coordinate system based on the location of the first electronic device, or a relative direction and/or a relative separation distance for displaying the first virtual object based on the location of the first electronic device.

7. The first electronic device of claim 1, wherein the instructions which, when executed by the at least one processor individually and/or collectively, cause the first electronic device to:

identify the input related to the first virtual object, based on image information received from the second electronic device via the established communication connection; and based on a determination that the location of the first virtual object is changed within an area corresponding to the FOV of the user of the second electronic device, and based on the input related to the first virtual object, change the reference for displaying the first virtual object, based on the changed location of the first virtual object.

8. The first electronic device of claim 1, wherein the reference for displaying the first virtual object comprises at least one of: the first electronic device, coordinates of the real space, an external object located within an area corresponding to the FOV of the user wearing the second electronic device, the user, or a third electronic device.

9. The first electronic device of claim 1, wherein the memory storing instructions which, when executed by the at least one processor individually and/or collectively, cause the first electronic device to perform user authentication based on the established communication connection with the second electronic device.

10. The first electronic device of claim 1, wherein the information related to the first virtual object includes at least one of a form, a size, a color, or a location of the first virtual object.

11. A method of operating a first electronic device, the method comprising:

establishing a communication connection with a second electronic device;

transmitting information related to a first virtual object for display on the second electronic device based on a location of the first electronic device to the second electronic device via the established communication connection, based on a determination that a user wearing the second electronic device uses the first electronic device regardless of whether the first electronic device is located in a real space corresponding to a field of view (FOV) of the user; and changing a reference for displaying the first virtual object, based on an input related to the first virtual object.

12. The method of claim 11, further comprising:

detecting an external object located in the real space corresponding to the FOV of the user wearing the second electronic device, based on image information received from the second electronic device;

acquiring a second virtual object corresponding to the external object; and transmitting information on the second virtual object to the second electronic device via the established communication connection.

13. The method of claim 12, further comprising, based on a determination that the user of the second electronic device uses the first electronic device, transmitting information related to hiding of the second virtual object to the second electronic device via the established communication connection.

14. The method of claim 11, further comprising determining whether the user uses the first electronic device, based on at least one of whether a display operatively connected to the electronic device is activated, execution information of an application program, whether information related to the first electronic device is included in an area corresponding to the FOV of the user of the second electronic device, or location information of the first electronic device and the second electronic device.

15. The method of claim 11, wherein the information related to the first virtual object comprises at least one of information related to coordinates for displaying the first virtual object in a coordinate system based on the location of the first electronic device or a relative direction and/or a relative separation distance for displaying the first virtual object based on the location of the first electronic device.

16. The method of claim 11, wherein the changing of the reference comprises:
identifying the input related to the first virtual object, based on image information received from the second electronic device via the established communication connection; and
based on a determination that the location of the first virtual object is changed within an area corresponding to the FOV of the user of the second electronic device, and based on the input related to the first virtual object, change the reference for displaying the first virtual object, based on the changed location of the first virtual object.

17. The method of claim 11, wherein the reference for displaying the first virtual object comprises at least one of the first electronic device, coordinates of the real space, an external object located within an area corresponding to the FOV of the user wearing the second electronic device, the user, or a third electronic device.

18. The method of claim 11, further comprising performing user authentication based on the established communication connection with the second electronic device.

19. The method of claim 18, wherein the transmitting information related to a first virtual object comprises transmitting information related to a second virtual object to the second electronic device via the established communication connection based on success in the user authentication.

20. The method of claim 11, wherein the information related to the first virtual object includes at least one of a form, a size, a color, or a location of the first virtual object.

* * * * *